(12) United States Patent
Ikriannikov et al.

(10) Patent No.: US 9,373,438 B1
(45) Date of Patent: Jun. 21, 2016

(54) COUPLED INDUCTOR ARRAYS AND ASSOCIATED METHODS

(71) Applicant: Volterra Semiconductor Corporation, San Jose, CA (US)

(72) Inventors: Alexandr Ikriannikov, Castro Valley, CA (US); Ilija Jergovic, Palo Alto, CA (US); Andrew Burstein, Pleasanton, CA (US); Serhii Mikhailovich Zhak, North Andover, MA (US); Brett A. Miwa, Wellesley, MA (US); Jizheng Qiu, Lowell, MA (US); Michael W. Baker, Arlington, MA (US); Justin Michael Burkhart, Bolton, MA (US); Xin Zhou, Nashua, NH (US)

(73) Assignee: Volterra Semiconductor LLC, San Jose, CA (US)

( * ) Notice: Subject to any disclaimer, the term of this patent is extended or adjusted under 35 U.S.C. 154(b) by 0 days.

(21) Appl. No.: 14/199,833

(22) Filed: Mar. 6, 2014

Related U.S. Application Data

(63) Continuation-in-part of application No. 13/303,062, filed on Nov. 22, 2011, now abandoned.

(51) Int. Cl.
*H01F 17/04* (2006.01)
*H01F 27/24* (2006.01)
(Continued)

(52) U.S. Cl.
CPC .............. *H01F 27/255* (2013.01); *H01F 27/24* (2013.01); *H01F 27/28* (2013.01); *H01F 41/02* (2013.01)

(58) Field of Classification Search
CPC ............. H01F 3/02; H01F 3/08; H01F 17/04; H01F 19/00; H01F 19/02; H01F 19/04; H01F 19/06; H01F 19/08; H01F 27/255; H01F 27/24; H01F 27/245; H01F 27/28; H01F 27/2847; H01F 27/2885; H01F 27/288; H01F 41/02; H01F 41/0246; H01F 41/0604
USPC ............... 336/221, 83, 233, 170, 84 C, 84 M; 29/606
See application file for complete search history.

(56) References Cited

U.S. PATENT DOCUMENTS 2,212,543 A   8/1940   Jovy
3,878,495 A   4/1975   Thomas
(Continued)

FOREIGN PATENT DOCUMENTS

DE   10 2006 03455   6/2007
EP   0 012 629   6/1980
(Continued)

OTHER PUBLICATIONS

Datasheet, Panasonic EXC28B Chip Bead Array, Feb. 1, 2011, 4 pages.
(Continued)

*Primary Examiner* — Mangtin Lian
(74) *Attorney, Agent, or Firm* — Lathrop & Gage LLP

(57) ABSTRACT

A coupled inductor array has length, width, and height. The coupled inductor array includes a monolithic magnetic core formed of a magnetic material having a distributed gap, and a plurality of windings embedded in the monolithic magnetic core. Each winding forms a respective winding loop of one or more turns around a respective winding axis, and each winding axis extends in the height direction. Areas of the monolithic magnetic core enclosed by the winding loops are greater than areas of the monolithic magnetic core outside of the winding loops, as seen when the coupled inductor array is viewed cross-sectionally in the height direction. One possible application of the coupled inductor array is in a multi-phase switching power converter.

14 Claims, 24 Drawing Sheets

(51) Int. Cl.
H01F 27/02 (2006.01)
H01F 27/28 (2006.01)
H01F 27/255 (2006.01)
H01F 41/02 (2006.01)

(56) References Cited

U.S. PATENT DOCUMENTS

| | | | |
|---|---|---|---|
| 4,455,545 | A | 6/1984 | Shelly |
| 4,488,136 | A | 12/1984 | Hansen et al. |
| 4,543,554 | A | 9/1985 | Muellenheim et al. |
| 4,636,752 | A | 1/1987 | Saito |
| 5,003,277 | A | 3/1991 | Sokai et al. |
| 5,023,578 | A | 6/1991 | Kaneko et al. |
| 5,161,098 | A | 11/1992 | Balakrishnan |
| 5,177,460 | A | 1/1993 | Dhyanchand et al. |
| 5,182,535 | A | 1/1993 | Dhyanchand |
| 5,225,971 | A | 7/1993 | Spreen |
| 5,353,001 | A | 10/1994 | Meinel et al. |
| 5,436,818 | A | 7/1995 | Barthold |
| 5,469,334 | A | 11/1995 | Balakrishnan |
| 5,565,837 | A | 10/1996 | Godek |
| 5,568,111 | A | 10/1996 | Metsler |
| 5,574,420 | A | 11/1996 | Roy et al. |
| 5,594,402 | A | 1/1997 | Krichtafovitch et al. |
| 5,631,822 | A | 5/1997 | Siberkleit et al. |
| 5,939,966 | A | 8/1999 | Shin' Ei |
| 6,060,977 | A | 5/2000 | Yamamoto et al. |
| 6,147,584 | A | 11/2000 | Shin'el |
| 6,259,345 | B1 | 7/2001 | De Graaf et al. |
| 6,342,778 | B1 | 1/2002 | Catalano et al. |
| 6,348,848 | B1 | 2/2002 | Herbert |
| 6,362,986 | B1 | 3/2002 | Schultz et al. |
| 6,377,155 | B1 | 4/2002 | Allen et al. |
| 6,420,953 | B1 | 7/2002 | Dadafshar |
| 6,477,414 | B1 | 11/2002 | Silvian |
| 6,549,111 | B1 | 4/2003 | De Graaf et al. |
| 6,737,951 | B1 | 5/2004 | Decristofaro et al. |
| 6,784,644 | B2 | 8/2004 | Xu et al. |
| 6,791,444 | B1 | 9/2004 | Masuda et al. |
| 6,867,678 | B2 | 3/2005 | Yang |
| 6,885,274 | B2 | 4/2005 | Hsu et al. |
| 6,967,553 | B2* | 11/2005 | Jitaru ............................ 336/178 |
| 6,980,077 | B1 | 12/2005 | Chandrasekaran et al. |
| 7,126,452 | B2* | 10/2006 | Teshima et al. ................. 336/200 |
| 7,187,263 | B2 | 3/2007 | Vinciarelli |
| 7,199,695 | B1 | 4/2007 | Zhou et al. |
| 7,239,530 | B1 | 7/2007 | Djekic et al. |
| 7,259,648 | B2 | 8/2007 | Matsutani et al. |
| 7,280,025 | B2 | 10/2007 | Sano |
| 7,292,128 | B2 | 11/2007 | Hanley |
| 7,315,463 | B2 | 1/2008 | Schrom et al. |
| 7,317,305 | B1 | 1/2008 | Stratakos et al. |
| 7,352,269 | B2 | 4/2008 | Li et al. |
| 7,425,883 | B2 | 9/2008 | Matsutani et al. |
| 7,498,920 | B2 | 3/2009 | Sullivan et al. |
| 7,504,808 | B2 | 3/2009 | Schrom et al. |
| 7,525,406 | B1 | 4/2009 | Cheng |
| 7,525,408 | B1 | 4/2009 | Li et al. |
| 7,548,046 | B1 | 6/2009 | Stratakos et al. |
| 7,567,163 | B2 | 7/2009 | Dadafshar et al. |
| 7,994,888 | B2 | 8/2011 | Ikriannikov |
| 2002/0067234 | A1 | 6/2002 | Kung |
| 2002/0093413 | A1 | 7/2002 | Shin'ei |
| 2002/0113290 | A1* | 8/2002 | Lemaire ............... H01F 17/0006 257/528 |
| 2003/0052767 | A1 | 3/2003 | Yamanobe et al. |
| 2003/0134612 | A1 | 7/2003 | Nakayama et al. |
| 2004/0085173 | A1 | 5/2004 | Decristofaro et al. |
| 2004/0113741 | A1 | 6/2004 | Li et al. |
| 2005/0024179 | A1 | 2/2005 | Chandrasekaran et al. |
| 2006/0012348 | A1 | 1/2006 | Zhao et al. |
| 2006/0038651 | A1 | 2/2006 | Mizushima et al. |
| 2006/0044101 | A1 | 3/2006 | Frutschy et al. |
| 2006/0089022 | A1 | 4/2006 | Sano |
| 2006/0119461 | A1 | 6/2006 | Kawarai |
| 2006/0145804 | A1* | 7/2006 | Matsutani et al. ............. 336/200 |
| 2006/0158297 | A1 | 7/2006 | Sutardja |
| 2006/0197510 | A1 | 9/2006 | Chandrasekaran |
| 2007/0097571 | A1 | 5/2007 | Dinh et al. |
| 2007/0175701 | A1 | 8/2007 | Xu et al. |
| 2007/0176726 | A1 | 8/2007 | Xu et al. |
| 2007/0268104 | A1 | 11/2007 | Chan et al. |
| 2007/0285202 | A1 | 12/2007 | Ito et al. |
| 2008/0012674 | A1 | 1/2008 | Sano et al. |
| 2008/0024259 | A1 | 1/2008 | Chandrasekaran et al. |
| 2008/0150666 | A1 | 6/2008 | Chandrasekaran et al. |
| 2008/0169769 | A1 | 7/2008 | Lee |
| 2008/0205098 | A1 | 8/2008 | Xu et al. |
| 2009/0040000 | A1 | 2/2009 | Hopper et al. |
| 2009/0179723 | A1 | 7/2009 | Ikriannikov et al. |
| 2009/0231081 | A1 | 9/2009 | Ikriannikov et al. |
| 2009/0237197 | A1 | 9/2009 | Ikriannikov et al. |
| 2010/0007457 | A1 | 1/2010 | Yan et al. |
| 2010/0013587 | A1 | 1/2010 | Yan et al. |
| 2010/0026443 | A1 | 2/2010 | Yan et al. |
| 2010/0271161 | A1 | 10/2010 | Yan et al. |
| 2010/0277267 | A1* | 11/2010 | Bogert et al. .................. 336/221 |
| 2011/0018669 | A1 | 1/2011 | Ikriannikov |
| 2011/0032068 | A1 | 2/2011 | Ikriannikov |
| 2011/0035607 | A1 | 2/2011 | Ikriannikov |
| 2011/0043317 | A1 | 2/2011 | Ikriannikov |
| 2011/0148559 | A1 | 6/2011 | Ikriannikov |
| 2011/0148560 | A1 | 6/2011 | Ikriannikov |
| 2011/0169476 | A1 | 7/2011 | Ikriannikov |
| 2011/0260822 | A1 | 10/2011 | Ikriannikov |
| 2011/0279100 | A1 | 11/2011 | Ikriannikov |
| 2011/0286143 | A1 | 11/2011 | Ikriannikov |
| 2011/0286144 | A1 | 11/2011 | Ikriannikov |
| 2012/0056704 | A1* | 3/2012 | Nagano et al. ................. 336/170 |
| 2012/0098632 | A1* | 4/2012 | Markowski ........... H01F 27/346 336/170 |

FOREIGN PATENT DOCUMENTS

| | | |
|---|---|---|
| EP | 0 755 060 | 1/1997 |
| EP | 1 519 392 | 3/2005 |
| EP | 1 632 964 | 3/2006 |
| EP | 1 833 165 | 9/2007 |
| EP | 1 835 604 | 9/2007 |
| EP | 1 950 773 | 7/2008 |
| JP | 08-250332 | 9/1996 |
| JP | 11 307369 | 11/1999 |
| JP | 2000-164431 | 6/2000 |
| JP | 2005310865 | 11/2005 |
| WO | WO 2006/026674 | 3/2006 |

OTHER PUBLICATIONS

Datasheet, TDK TCM Series Common Mode Filters, Sep. 2011, 7 pages.
Chandrasekaran, S. et al., "Integrated Magnetics for Interleaved DC-Dc Boost for Fuel Cell Powered Vehicles," 35th Annual IEEE Power Electronics Specialists Conferences, 356-61 (2004).
Cooper Bussmann, "Product Data Sheet for Low Profile Inductor (Surface Mount)" retreived from http://www.angliac.com, May 2003.
Dong et al., Evaluation of Coupled Inductor Voltage Regulators, Applied Power Electronics Conference and Exposition, pp. 831-837, Feb. 24-28, 2008.
Dong et al., The Short Winding Path Coupled Inductor Voltage Regulators, Applied Power Electronics Conference and Exposition, pp. 1446-1452, Feb. 24-28, 2008.
Dong et al., Twisted Core Coupled Inductors for Microprocessor Voltage Regulators, Power Electronics Specialists Conference, pp. 2386-2392, Jun. 17-21, 2007.
Pulse Product News Press Release dated Nov. 25, 2008.
Pulse, SMT Power Inductors datasheet, 2 pages, Nov. 2007.
Pulse, SMT Power Inductors Power Beads—PA0766NL Series; pp. 53-55; Mar. 2006.
Wong, Pit-Leong, et al., "Investigating Coupling Inductors in the Interleaving" Applied Power Electronics Conference and Exposition, 2000. APEC 2000. Fifteenth Annual IEEE; Mar. 2000; pp. 973-978.

(56) References Cited

OTHER PUBLICATIONS

Wong, Pit-Leong, et al.; A Novel Modeling Concept for Multi-coupling Core Structures; Center for Power Electronics Systems; IEEE.

Wong, Pit-Leong, et al.; Performance Improvements of Interleaving VRMs With Coupling Inductors, IEEE Transactions on Power Electronics; vol. 16, No. 4; pp. 499-507; Jul. 2001.

Xu, J., et al; Analysis by Finite Element Method of a Coupled Inductor Circuit Used as Current Injection Interface; IEEE; pp. 147-151; 1996.

DiBene II et al., "A 400 Amp fully Integrated Silicon Voltage Regulator with in-die magnetically coupled embedded inductors," APEC 2010, Feb. 25, 2010, 25 pages.

Schrom et al., "A 60MHz 50W Fine-Grain Package-Integrated VR Powering a CPU from 3.3V," APEC 2010, Feb. 25, 2010, 12 pages.

U.S. Appl. No. 13/303,062, Non-Final Rejection, Mar. 7, 2013, 14 pages.

U.S. Appl. No. 13/303,062, Response to Non-Final Rejection, Sep. 6, 2013, 15 pages.

U.S. Appl. No. 13/303,062, Final Rejection, Oct. 23, 2013, 14 pages.

U.S. Appl. No. 13/303,062, Request for Reconsideration, Dec. 10, 2013, 8 pages.

* cited by examiner

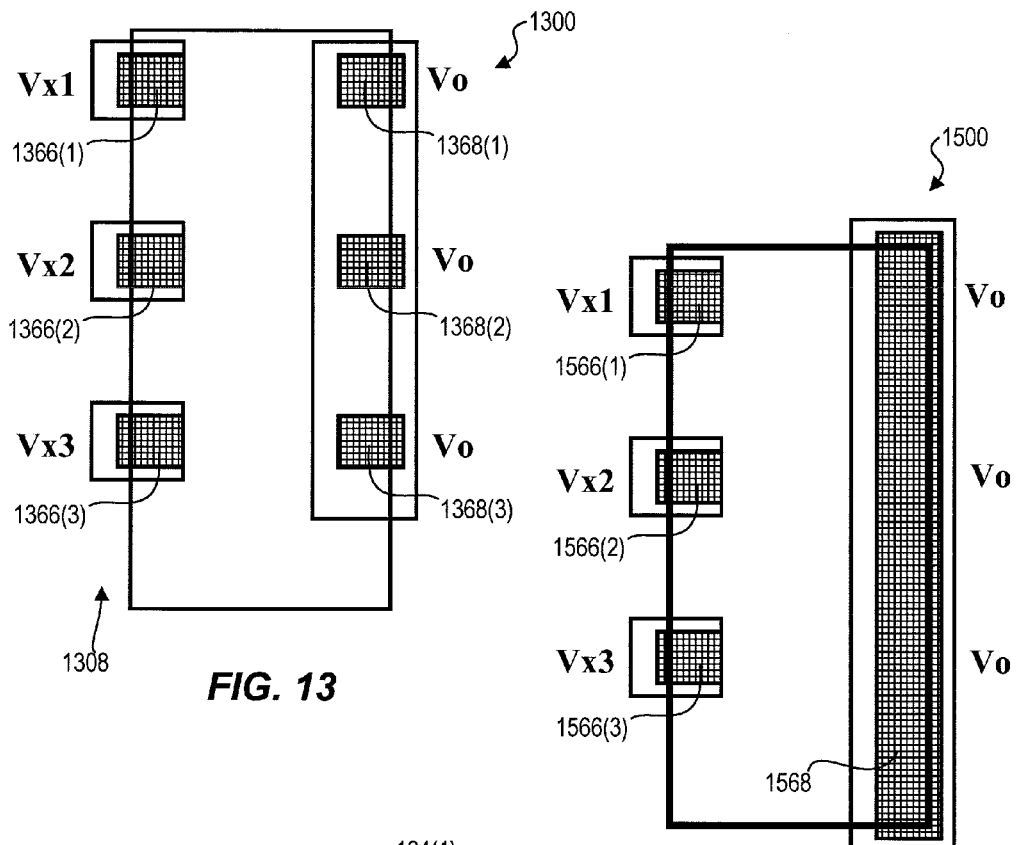
FIG. 13
FIG. 15
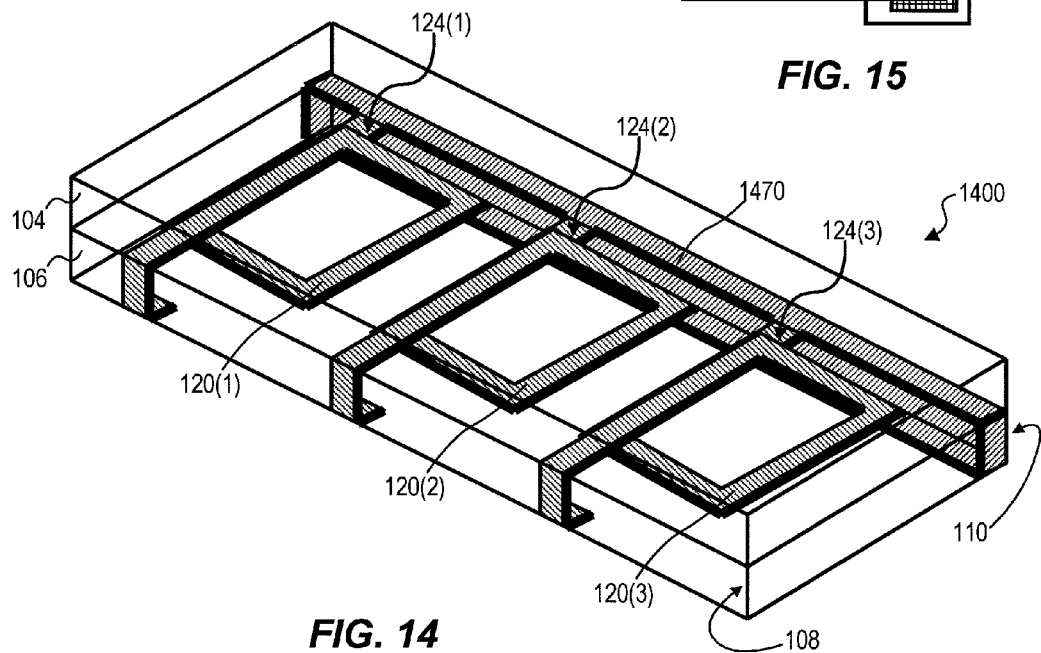
FIG. 14

(PRIOR-ART)

(PRIOR-ART)

COUPLED INDUCTOR ARRAYS AND ASSOCIATED METHODS

RELATED APPLICATIONS

This application is a continuation-in-part of U.S. patent application Ser. No. 13/303,062, filed Nov. 22, 2011, which is incorporated herein by reference.

BACKGROUND

It is known to electrically couple multiple switching sub-converters in parallel to increase switching power converter capacity and/or to improve switching power converter performance. A multi-phase switching power converter typically performs better than a single-phase switching power converter of otherwise similar design. In particular, the out-of-phase switching in a multi-phase converter results in ripple current cancellation at the converter output filter and allows the multi-phase converter to have a better transient response than an otherwise similar single-phase converter.

As taught in U.S. Pat. No. 6,362,986 to Schultz et al., which is incorporated herein by reference, a multi-phase switching power converter's performance can be improved by magnetically coupling the energy storage inductors of two or more phases. Such magnetic coupling results in ripple current cancellation in the inductors and increases ripple switching frequency, thereby improving converter transient response, reducing input and output filtering requirements, and/or improving converter efficiency, relative to an otherwise identical converter without magnetically coupled inductors.

Two or more magnetically coupled inductors are often collectively referred to as a "coupled inductor" and have associated leakage inductance and magnetizing inductance values. Magnetizing inductance is associated with magnetic coupling between windings; thus, the larger the magnetizing inductance, the stronger the magnetic coupling between windings. Leakage inductance, on the other hand, is associated with energy storage. Thus, the larger the leakage inductance, the more energy stored in the inductor. As taught in Schultz et al., larger magnetizing inductance values are desirable to better realize the advantages of using a coupled inductor, instead of discrete inductors, in a switching power converter. Leakage inductance, on the other hand, typically must be within a relatively small value range. In particular, leakage inductance must be sufficiently large to prevent excessive ripple current magnitude, but not so large that converter transient response suffers.

SUMMARY

In an embodiment, a coupled inductor array includes a magnetic core and N windings, where N is an integer greater than one. The magnetic core has opposing first and second sides, and a linear separation distance between the first and second sides defines a length of the magnetic core. The N windings pass at least partially through the magnetic core in the lengthwise direction, and each of the N windings forms a loop in the magnetic core around a respective winding axis. Each winding axis is generally perpendicular to the lengthwise direction and parallel to but offset from each other winding axis. Each winding has opposing first and second ends extending towards at least the first and second sides of the magnetic core, respectively.

In an embodiment, a multi-phase switching power converter includes a coupled inductor and N switching circuits, where N is an integer greater than one. The coupled inductor includes a magnetic core having opposing first and second sides, and a linear separation distance between the first and second sides defines a length of the magnetic core. The N windings pass at least partially through the magnetic core in the lengthwise direction, and each of the N windings forms a loop in the magnetic core around a respective winding axis. Each winding axis is generally perpendicular to the lengthwise direction and parallel to but offset from each other winding axis. Each winding has opposing first and second ends extending toward at least the first and second sides of the magnetic core, respectively. Each switching circuit is adapted to be capable of repeatedly switching the first end of a respective one of the N windings between at least two different voltage levels.

In an embodiment, an electronic device includes an integrated circuit package, a semiconductor die housed in the integrated circuit package, and a coupled inductor housed in the integrated circuit package and electrically coupled to the semiconductor die. The coupled inductor includes a magnetic core having opposing first and second sides, and a linear separation distance between the first and second sides defines a length of the magnetic core. The coupled inductor further includes N windings passing at least partially through the magnetic core in the lengthwise direction, where N is an integer greater than one. Each of the N windings forms a loop in the magnetic core around a respective winding axis, and each winding axis is generally perpendicular to the lengthwise direction and parallel to but offset from each other winding axis. Each winding has opposing first and second ends extending toward at least the first and second sides of the magnetic core, respectively.

In an embodiment, a coupled inductor array has length, width, and height. The coupled inductor array includes a monolithic magnetic core formed of a magnetic material having a distributed gap, and a plurality of windings embedded in the monolithic magnetic core. Each winding forms a respective winding loop of one or more turns around a respective winding axis, and each winding axis extends in the height direction. Areas of the monolithic magnetic core enclosed by the winding loops are greater than areas of the monolithic magnetic core outside of the winding loops, as seen when the coupled inductor array is viewed cross-sectionally in the height direction.

In an embodiment, method for forming a coupled inductor array including a magnetic core with at least one non-magnetic structure embedded therein includes the steps of: (1) disposing, in a height direction, at least two conductor layers on a magnetic core portion, such that the conductor layers at least partially form at least two winding loops, as seen when viewed in the height direction; (2) disposing one or more non-magnetic structures on the magnetic core portion and outside of the winding loops, as seen when viewed in the height direction; and (3) disposing magnetic material on the magnetic core portion, the conductor layers, and the one or more non-magnetic structures.

BRIEF DESCRIPTION OF THE DRAWINGS

FIG. 13 shows one possible printed circuit board footprint for use with the coupled inductor array of FIG. 1 in a multi-phase buck converter application, according to an embodiment.

FIG. 14 shows a perspective view of a coupled inductor array similar to that of FIG. 1, but where winding second ends electrically couple to a common tab, according to an embodiment.

FIG. 15 shows one possible printed circuit board footprint for use with the coupled inductor array of FIG. 14 in a multi-phase buck converter application, according to an embodiment.

DETAILED DESCRIPTION OF THE EMBODIMENTS

Disclosed herein are coupled inductor arrays that may be used, for example, as energy storage inductors in a multi-phase switching power converter. Such coupled inductors may realize one or more significant advantages, as discussed below. For example, certain embodiments of these inductors achieve relatively strong magnetic coupling, relatively large leakage inductance values and/or relatively low core losses in a small package size. As another example, leakage and/or magnetizing inductance is readily adjustable during the design and/or manufacture of certain embodiments. In the following disclosure, specific instances of an item may be referred to by use of a numeral in parentheses (e.g., winding 118(1)) while numerals without parentheses refer to any such item (e.g., windings 118).

Figure 1:
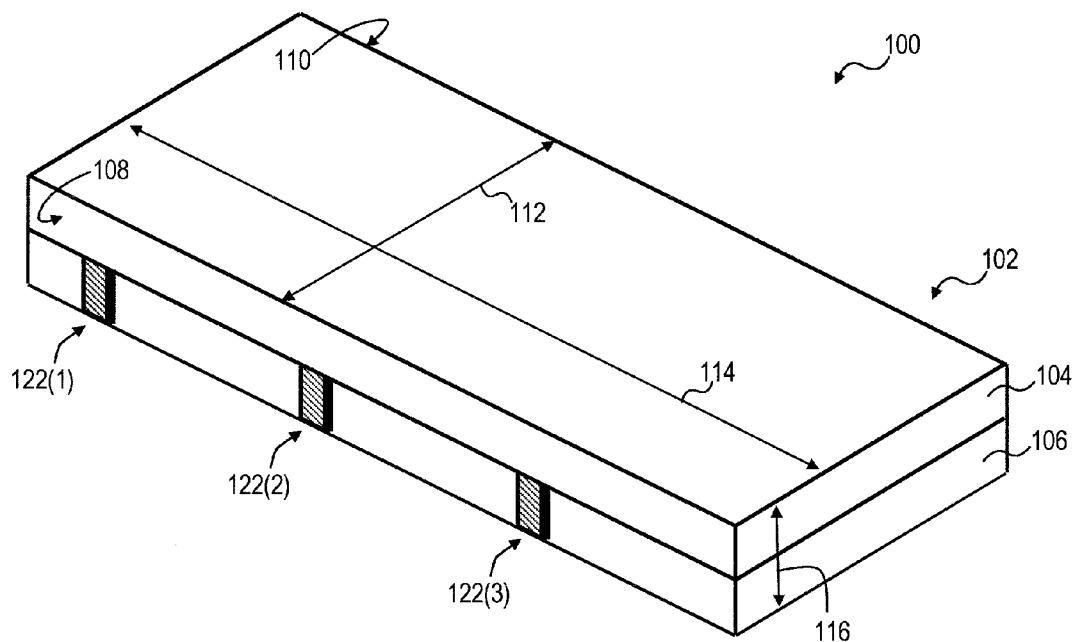
FIG. 1 shows a perspective view of a coupled inductor array, according to an embodiment.
Figure 2:
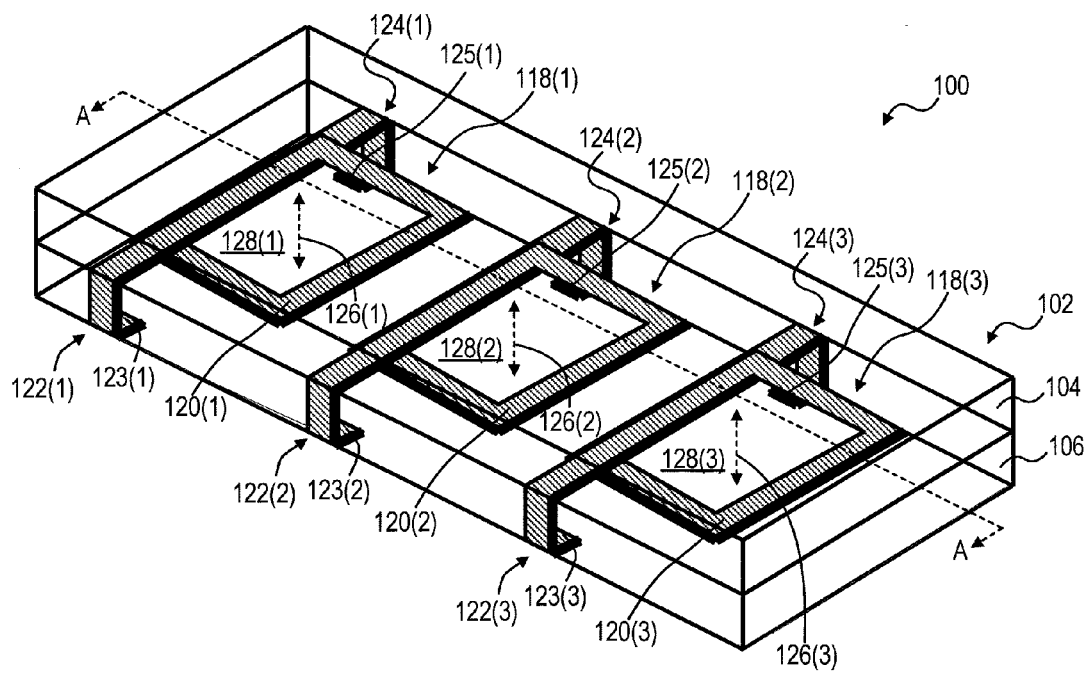
FIG. 2 shows a perspective view of the FIG. 1 coupled inductor array with its magnetic core shown as transparent.
Figure 3:
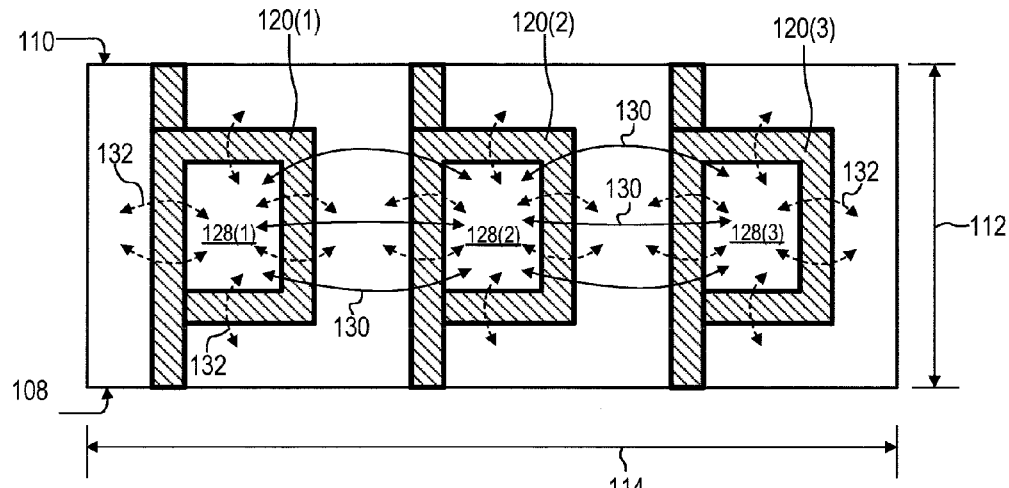
FIG. 3 shows a top plan view of the FIG. 1 coupled inductor array with a top plate removed.

FIG. 1 shows a perspective view of a coupled inductor array 100. Array 100 includes a magnetic core 102 formed of a magnetic material, such as a ferrite material, a powder iron material within a binder, or a number of layers of magnetic film. Magnetic core 102 includes a top plate 104 disposed on a bottom plate 106 and has opposing first and second sides 108, 110 separated by a linear separation distance defining a core length 112. Magnetic core 102 also has a width 114 perpendicular to length 112, as well as a height 116 perpendicular to both length 112 and width 114. FIG. 2 shows array 100 with magnetic core 102 shown as transparent. FIG. 3 shows a top plan view of array 100 with top plate 104 removed.

Coupled inductor array 100 further includes two or more windings 118 disposed in magnetic core 102 between top and bottom plates 104, 106. While the figures of the present disclosure show array 100 as having three windings 118, it should be understood that such arrays could be modified to have any number of windings greater than one. In order words, the coupled inductor arrays disclosed herein could be adapted to have N windings, where N is any integer greater than one.

Each winding 118 passes through magnetic core 102 in the lengthwise 112 direction and forms a loop 120 in magnetic core 102. Loops 120 are generally planar in typical embodiments. Although loops 120 are shown as forming a single turn, they may alternately form two or more turns to promote low magnetic flux density and associated low core losses. Opposing first and second ends 122, 124 of windings 118 extend towards core first and second sides 108, 110, respectively. Each first end 122 forms a respective first solder tab 123, and each second end 124 forms a respective second solder tab 125. Solder tabs 123, 125 are configured for surface mount attachment to a printed circuit board (PCB).

Each loop 120 is wound around a respective winding axis 126, and each winding axis 126 is generally parallel to but offset from each other winding axis 126 in the widthwise 114 direction. Accordingly, each loop encloses a respective area 128 within magnetic core 102, and each loop area 128 is non-overlapping with each other loop area 128 along the core's width 114. Such configuration causes coupled inductor array 100 to have "negative" or "inverse" magnetic coupling. Inverse magnetic coupling is characterized in array 100, for example, by current of increasing magnitude flowing through one of windings 118 in a first direction inducing current of increasing magnitude flowing through the remaining windings 118 in the first direction. For example, current of increasing magnitude flowing into winding 118(2) from core first side 108 will induce current of increasing magnitude flowing into windings 118(1), 118(3) from core first side 108.

Array 100's configuration promotes large magnetizing and leakage inductance values and low-reluctance magnetic flux paths. In particular, windings 118 are typically longer in the lengthwise 112 direction than in the widthwise 114 direction, resulting in large portions of windings 118 being immediately adjacent and providing wide paths for magnetic flux coupling adjacent windings. Magnetic flux coupling adjacent windings is represented by solid-line arrows 130 in FIG. 3, only some of which are labeled for illustrative clarity. Such wide paths provide a low reluctance path for magnetizing flux, thereby promoting strong magnetic coupling between windings and low core losses.

Additionally, magnetic core 102 typically extends beyond loops 120, such that each loop area 128 is smaller than an area of magnetic core 102 in the same plane as the loop. Consequentially, magnetic core 102 provides paths for leakage magnetic flux around much or all of each loop 120's perimeter, where leakage magnetic flux is magnetic flux generated by changing current through one winding 118 that does not couple the remaining windings 118. Leakage magnetic flux is represented by dashed-line arrows 132 in FIG. 3, only some of which are labeled for illustrative clarity. Consequentially, each winding 118 has a relatively wide, low reluctance leakage flux path, thereby promoting low core losses and large leakage inductance values associated with windings 118.

Figure 4:
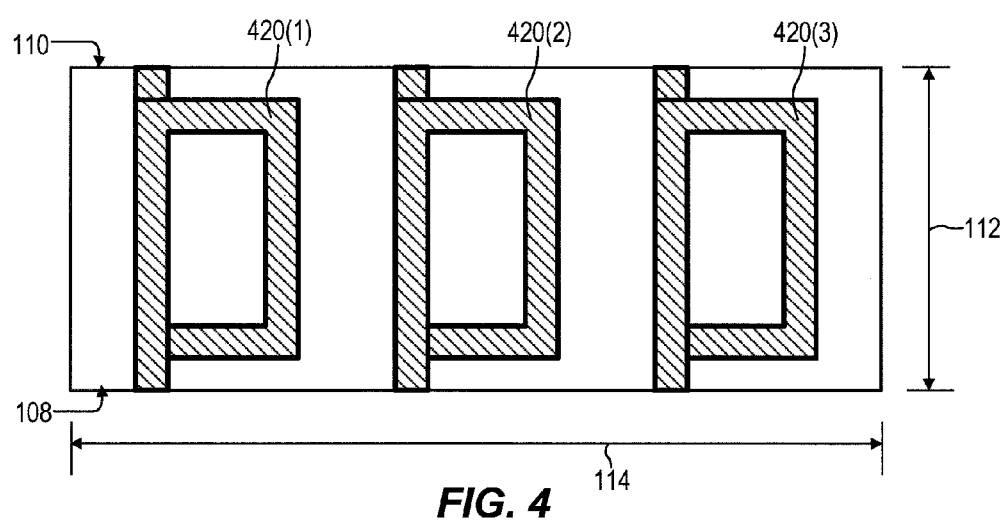
FIG. 4 shows a top plan view of an alternate embodiment of the FIG. 1 coupled inductor array with a top plate removed and with longer winding loops than the FIG. 3 embodiment.

Magnetizing inductance and leakage inductance can be independently controlled during the design and/or manufacture of coupled inductor array 100 by controlling the size and/or shape of windings 118, and/or the extent to which magnetic core 102 extends beyond winding loops 120. In particular, magnetizing inductance can be increased by increasing the portions of windings 118 that are immediately adjacent and/or by decreasing the spacing between windings 118. For example, FIG. 4 shows a top plan view analogous to FIG. 3, but of an alternative embodiment including winding loops 420 in place of winding loops 120. Winding loops 420 are longer in lengthwise direction 112 than winding loops 120 of the FIG. 3 embodiment. Accordingly, the FIG. 4 embodiment will have a larger magnetizing inductance than the FIG. 3 embodiment, assuming all else is equal. However, the relatively long length of winding loops 420 reduces the portion of magnetic core 102 available for coupling leakage magnetic flux. Thus, the FIG. 4 embodiment will have smaller leakage inductance values than the FIG. 3 embodiment, assuming all else is equal.

Figure 5:
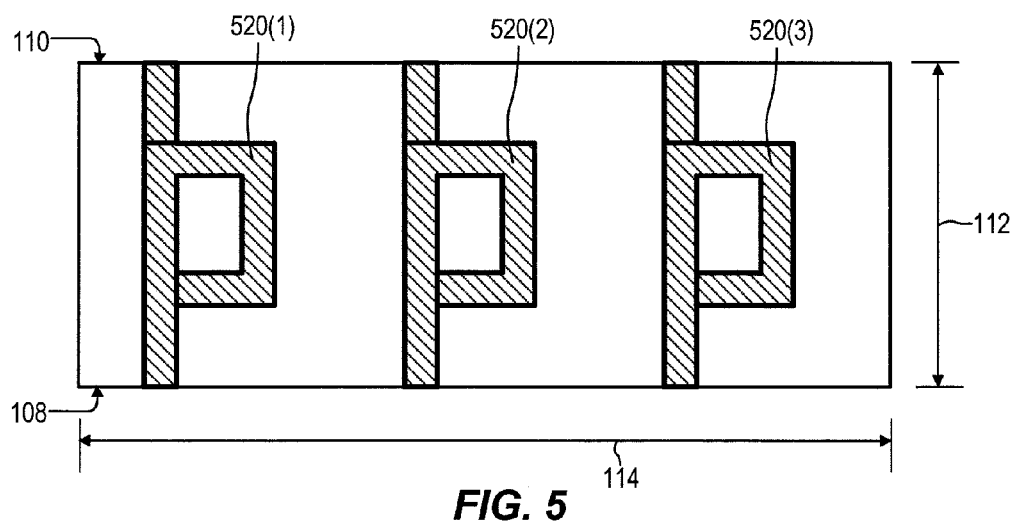
FIG. 5 shows a top plan view of an alternate embodiment of the FIG. 1 coupled inductor array with a top plate removed and with smaller winding loops than the FIG. 3 embodiment.

As another example, FIG. 5 shows a cross-sectional view analogous to FIG. 3, but of an alternate embodiment including winding loops 520 in place of winding loops 120. Winding loops 520 are smaller than winding loops 120 of the FIG. 3 embodiment. Thus, a greater portion of magnetic core 102 is outside of winding loops in the FIG. 5 embodiment than in the FIG. 3 embodiment, resulting in a larger portion of the core being available for leakage magnetic flux in the FIG. 5 embodiment. Thus, the FIG. 5 embodiment will have larger leakage inductance values than the FIG. 3 embodiment, assuming all else is equal. However, a smaller portion of the winding loops are immediately adjacent in the FIG. 5 embodiment than in the FIG. 3 embodiment. Thus, the FIG. 5 embodiment will have a smaller magnetizing inductance than the FIG. 3 embodiment, assuming all else is equal.

Figure 6:
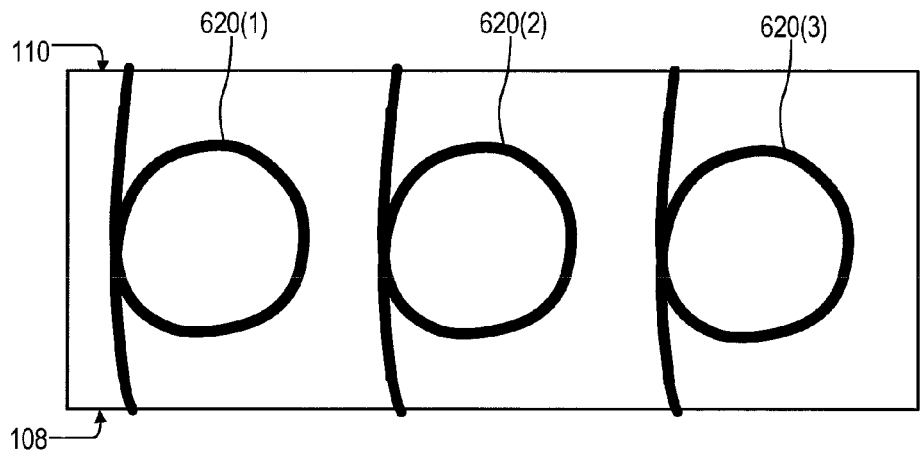
FIG. 6 shows a top plan view of an alternate embodiment of the FIG. 1 coupled inductor array with a top plate removed and with circular winding loops.

The embodiments discussed above have rectangular shaped winding loops, which help maximize portions of the loops that are immediately adjacent, thereby promoting large magnetizing inductance values. However, winding loops can have other shapes. For example, FIG. 6 shows a cross-sectional view analogous to FIG. 3, but of an alternate embodiment including circular winding loops 620 in place of rectangular winding loops 120. The circular shape reduces loop length, thereby promoting low winding resistance. However, the circular shape also reduces portions of winding loops 620 that are immediately adjacent, thereby reducing magnetizing inductance.

Figure 7:
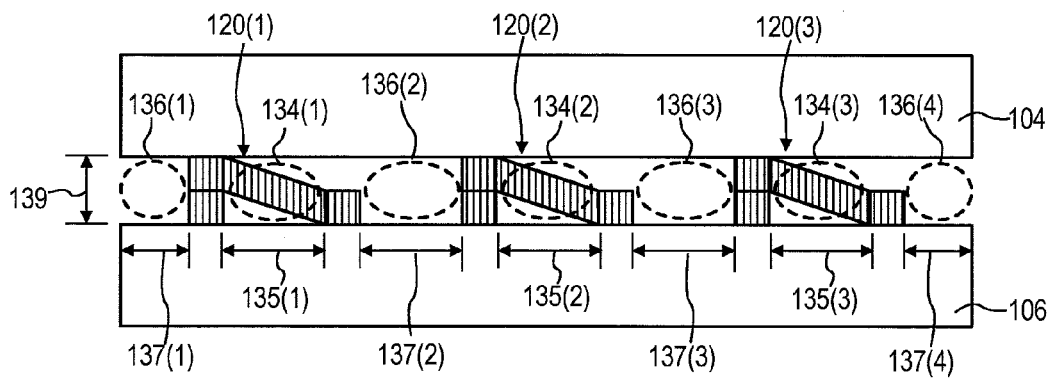
FIG. 7 shows a cross-sectional view of the FIG. 1 coupled inductor array.

Magnetic core 102's configuration can also be varied during the design and/or manufacture of coupled inductor array 100 to control magnetizing and/or leakage inductance. FIG. 7 shows a cross-sectional view of coupled inductor array 100 taken along line segment A-A of FIG. 2. Portions 134 within winding loops 120 provide paths for both magnetic flux coupling windings 118 and leakage magnetic flux, while portions 136 outside of winding loops 120 provide paths for leakage magnetic flux only. Magnetizing inductance and leakage inductance are both roughly proportional to cross-sectional area of portions 134, and leakage inductance is also roughly proportional to cross-sectional area of portions 136. Thus, magnetizing and leakage inductance can be adjusted, for example, by adjusting widths 135 of portions 134, and leakage inductance can be independently adjusted, for example, by adjusting widths 137 of portions 136. Each instance of width 135 need not necessarily be the same, and each instance of width 137 also need not necessarily be the same. For example, in some embodiments, one portion 136 has a larger width 137 than other portions 136 to create asymmetrical leakage inductance values.

Magnetizing and leakage inductance can also be varied together by changing spacing 139 between top and bottom plates 104, 106. In general, the smaller spacing 139, the greater the magnetizing and leakage inductance.

Additionally, magnetizing inductance and/or leakage inductance can be controlled by controlling the reluctance of portions 134 and/or 136. For example, magnetizing and leakage inductance can be increased by adding magnetic material to portions 134 to decrease reluctance of the magnetic flux paths coupling windings 118 and the leakage magnetic flux paths. Similarly, leakage inductance can be increased by adding magnetic material to portions 136 to decrease reluctance of the leakage magnetic flux paths.

Figure 8:
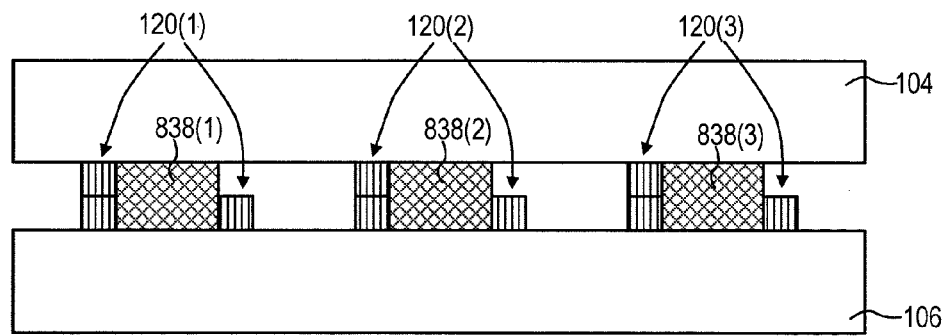
FIG. 8 shows a cross-sectional view of an alternate embodiment of the FIG. 1 coupled inductor array including coupling teeth.
Figure 9:
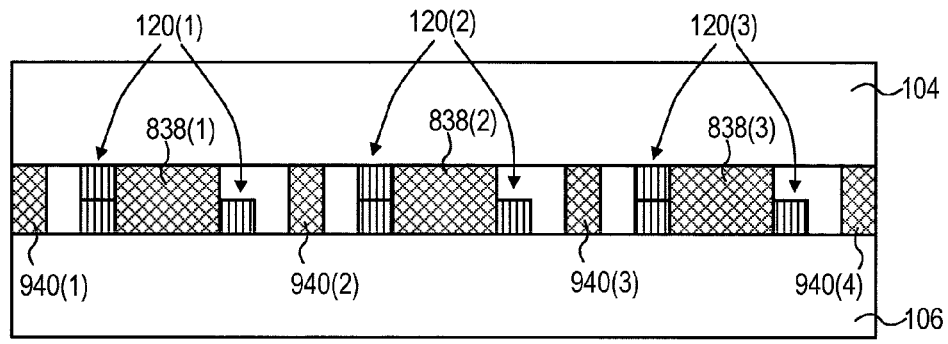
FIG. 9 shows a cross-sectional view of an alternate embodiment of the FIG. 1 coupled inductor array including both leakage and coupling teeth.

FIG. 8 shows a cross-sectional view analogous to FIG. 7, but of an alternate embodiment including coupling teeth 838 disposed between top and bottom plates 104, 106 in portions 134 within winding loops 120. Coupling teeth 838, which are formed of a magnetic material, reduce reluctance of the magnetic flux paths in portions 134, thereby increasing magnetizing and leakage inductance. As another example, FIG. 9 shows a cross-sectional view analogous to FIG. 7, but of an alternate embodiment including coupling teeth 838 in portions 134 and leakage teeth 940 disposed between top and bottom plates 104, 106 in portions 136. Leakage teeth 940, which are also formed of a magnetic material, reduce the reluctance of the magnetic flux paths in portions 136, thereby increasing leakage inductance values. Each of leakage teeth 940(2), 940(3) are disposed between adjacent winding loops, while leakage teeth 940(1), 940(4) are respectively disposed at opposing ends of the row of winding loops. The magnetic materials forming coupling teeth 838 and leakage teeth 940 need not be the same and can be individually selected to achieve desired magnetizing and leakage inductance values. For example, in certain embodiments, coupling teeth 838 are formed of a material having a higher magnetic permeability than leakage teeth 940. Coupling teeth 838 and leakage teeth 940 can alternately be formed of the same magnetic material to simplify core 102 construction, and both teeth can even be formed of the same material as top and bottom plates 104, 106 to further simplify core construction. In some embodiments, the magnetic materials forming coupling teeth 838 and/or winding teeth 940 are non-homogenous.

Figure 10:
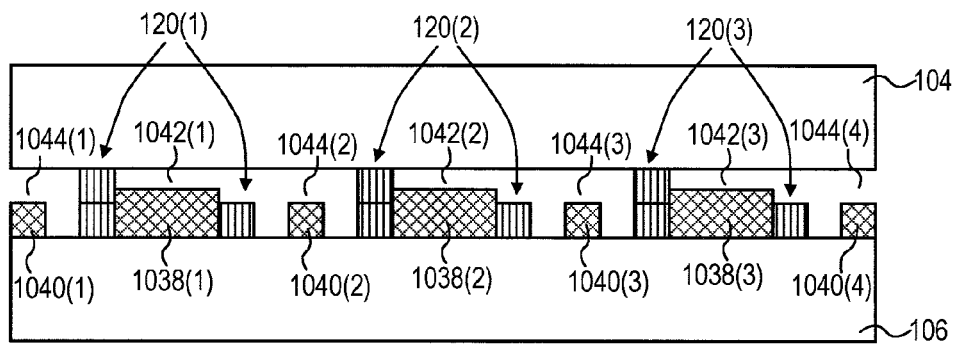
FIG. 10 shows a cross-sectional view of another alternate embodiment of the FIG. 1 coupled inductor array including both leakage and coupling teeth.
Figure 11:
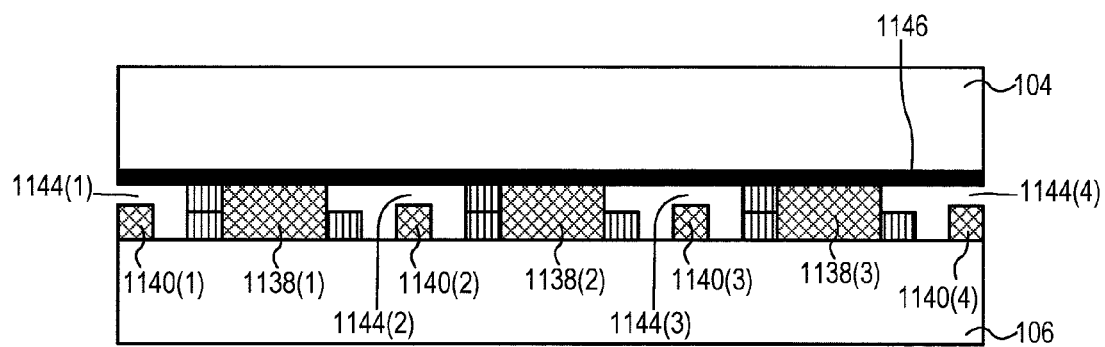
FIG. 11 shows a cross-sectional view of an alternate embodiment of the FIG. 1 coupled inductor array including leakage teeth, coupling teeth, and a non-magnetic spacer separating the coupling teeth from the top plate.

One or more of coupling teeth 838 may be separated from top and/or bottom plate 104, 106 by a gap filled with non-magnetic material, to control magnetizing and leakage inductance and/or to help prevent magnetic saturation. Such gaps are filled, for example, with air, plastic, paper, and/or adhesive. Similarly, one or more of leakage teeth 940 may be separated from top and/or bottom plate 104, 106 by a gap filled with non-magnetic material, such as air, plastic, paper, and/or adhesive, to control leakage inductance. For example, FIG. 10 shows a cross-sectional view analogous to FIG. 7, but of an alternate embodiment including coupling teeth 1038 separated from top plate 104 by air gaps 1042. The FIG. 10 embodiment further includes leakage teeth 1040 separated from top plate 104 by air gaps 1044. Thicknesses of air gaps 1042 and 1044 are optionally individually optimized and need not be the same. As another example, FIG. 11 shows a cross-sectional view analogous to FIG. 7, but of an alternate embodiment where each coupling tooth 1138 is separated from top plate 104 by a spacer 1146 formed of non-magnetic material, and each leakage tooth 1140 is separated from top plate 104 by a respective air gap 1144 as well as spacer 1146. In certain embodiments, spacer 1146 is formed of the same material as an insulator (not shown) separating overlapping portions of windings 118.

In certain embodiments, magnetic core 102 is formed of material having a distributed air gap, such as powder iron within a binder. In such embodiments, leakage inductance and/or magnetizing inductance can be also be adjusted by varying the material composition to change the distributed air gap properties.

Figure 12:
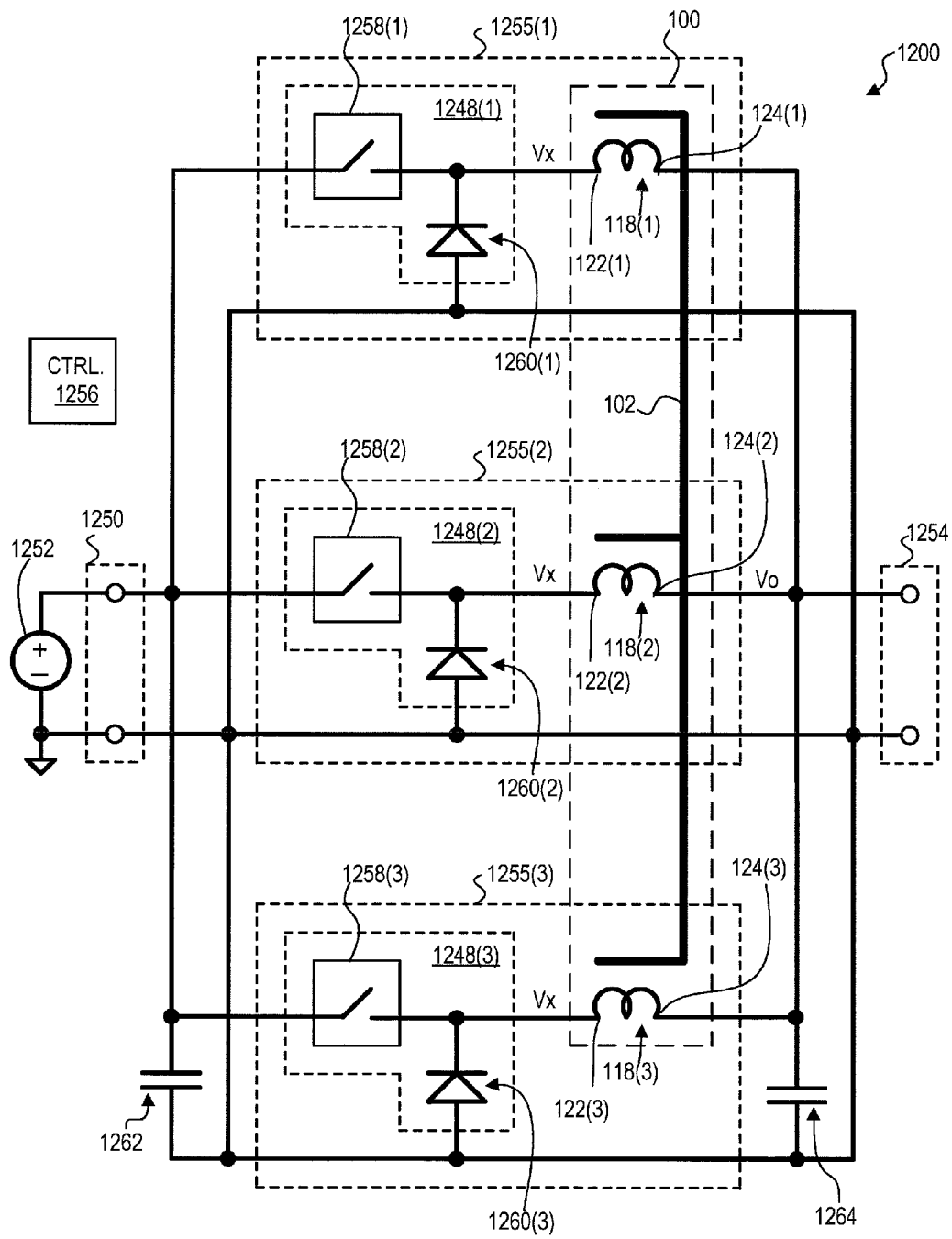
FIG. 12 shows a schematic of a three-phase buck converter including the coupled inductor array of FIG. 1, according to an embodiment.

One possible application of coupled inductor array 100 is in switching power converter applications, including but not limited to multi-phase buck converters, multi-phase boost converters, or multi-phase buck-boost converters. For example, FIG. 12 shows one possible use of coupled inductor array 100 in multi-phase buck converter. In particular, FIG. 12 shows a schematic of a three-phase buck converter 1200, which uses coupled inductor array 100 as a coupled inductor. Each winding first end 122 is electrically coupled to a respective switching node Vx, and each winding second end 124 is electrically coupled to a common output node Vo. A respective switching circuit 1248 is electrically coupled to each switching node Vx. Each switching circuit 1248 is electrically coupled to an input port 1250, which is in turn electrically coupled to an electric power source 1252. An output port 1254 is electrically coupled to output node Vo. Each switching circuit 1248 and respective inductor is collectively referred to as a "phase" 1255 of the converter. Thus, multi-phase buck converter 1200 is a three-phase converter.

A controller 1256 causes each switching circuit 1248 to repeatedly switch its respective winding first end 122 between electric power source 1252 and ground, thereby switching its first end between two different voltage levels, to transfer power from electric power source 1252 to a load (not shown) electrically coupled across output port 1254. Controller 1256 typically causes switching circuit 1248 to switch at a relatively high frequency, such as at 100 kilohertz or greater, to promote low ripple current magnitude and fast transient response, as well as to ensure that switching induced noise is at a frequency above that perceivable by humans.

Each switching circuit 1248 includes a control switching device 1258 that alternately switches between its conductive and non-conductive states under the command of controller 1256. Each switching circuit 1248 further includes a freewheeling device 1260 adapted to provide a path for current through its respective winding 118 when the control switching device 1258 of the switching circuit transitions from its conductive to non-conductive state. Freewheeling devices 1260 may be diodes, as shown, to promote system simplicity. However, in certain alternate embodiments, freewheeling devices 1260 may be supplemented by or replaced with a switching device operating under the command of controller 1256 to improve converter performance. For example, diodes in freewheeling devices 1260 may be supplemented by switching devices to reduce freewheeling device 1260 forward voltage drop. In the context of this disclosure, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier.

Controller 1256 is optionally configured to control switching circuits 1248 to regulate one or more parameters of multi-phase buck converter 1200, such as input voltage, input current, input power, output voltage, output current, or output power. Buck converter 1200 typically includes one or more input capacitors 1262 electrically coupled across input port 1250 for providing a ripple component of switching circuit 1248 input current. Additionally, one or more output capacitors 1264 are generally electrically coupled across output port 1254 to shunt ripple current generated by switching circuits 1248.

Buck converter 1200 could be modified to have a different number of phases, and coupled inductor array 100 could be modified accordingly to have a corresponding number of windings 118. Additionally, buck converter 1200 could be modified to incorporate two or more instances of coupled inductor array 100. For example, one alternate embodiment of converter 1200 includes six phases 1255 and two instances of coupled inductor array 100. A first instance of array 100 serves the first through third phases, and a second instance of array 100 serves the fourth through sixth phases. Buck converter 1200 could also be modified to have a different topology, such as that of a multi-phase boost converter or a multi-phase buck-boost converter, or an isolated topology, such as a flyback or forward converter.

FIG. 13 shows a printed circuit board (PCB) footprint 1300, which is one possible footprint for use with coupled inductor array 100 in a multi-phase buck converter application, such as buck converter 1200 (FIG. 12). Footprint 1300 includes pads 1366 for coupling each first solder tab 123 to a respective switching node Vx, as well as pads 1368 for coupling each second solder tab 125 to a common output node Vo. Due to array 100's inverse magnetic coupling, all switching nodes Vx are on a first side 1308 of footprint 1300, which promotes layout simplicity in a PCB including footprint 1300.

In certain alternate embodiments, each winding second end 124 is electrically coupled to a common conductor, such as a common tab to provide a low impedance connection to external circuitry. For example, FIG. 14 shows a perspective view of a coupled inductor array 1400, which is the same as array 100 (FIG. 1), but where winding second ends 124 electrically couple to a common tab 1470 instead of forming respective solder tabs. Tab 1470 is, for example, configured for surface mount attachment to a printed circuit board. FIG. 15 shows a PCB footprint 1500, which is one possible footprint for use with coupled inductor array 1400 in a multi-phase buck converter application, such as buck converter 1200 (FIG. 12). Footprint 1500 includes pads 1566 for coupling each first solder tab 123 to a respective switching node Vx, as well as pad 1568 for coupling common tab 1470 to a common output node Vo. It can be appreciated from FIG. 15 that common tab 1470 provides a large surface area for connecting to a PCB pad, thereby promoting a low impedance connection between the tab and a PCB and helping cool inductor 1400 as well as nearby components.

Although magnetic core 102 is shown as including discrete top and bottom plates 104, 106, core 102 can have other configurations. For example, top and bottom plates 104, 106 could alternately be part of a single piece magnetic element, optionally including coupling teeth 838 and/or leakage teeth 940. As another example, in some alternate embodiments, magnetic core 102 is a single piece monolithic structure with windings 118 embedded therein, such as a core formed by molding a composition including magnetic material in a binder. In such embodiments, there is no gap or separation between core sections, and magnetizing and leakage inductance can be varied by varying the magnetic material composition and/or the winding configuration, as discussed above. As yet another example, in certain alternate embodiments, magnetic core 102 is formed by disposing a plurality of layers or films of magnetic material. In such embodiments, a non-magnetic material is optionally disposed in at least part of portions 134 and/or 136 to create gaps analogous to gaps 1042, 1044 in FIG. 10. Additionally, in some alternate embodiments, magnetic core 102 completely surrounds winding loops 120. In embodiments including coupling teeth 838 and/or leakage teeth 940, such teeth could be discrete magnetic elements and/or part of another piece of magnetic core 102. For example, in some embodiments, at least one of coupling teeth 838 and/or leakage teeth 940 are part of top plate 104 or bottom plate 106.

Windings 118 are, for example, formed separately from core 102 and subsequently disposed in the core, such as before joining top and bottom plates 104, 106. In embodiments where core 102 is formed by molding a composition including magnetic material in a binder, windings 118 are, for example, separately formed and placed in a mold prior to adding the composition to the mold. Windings 118 could also be formed by applying a conductive film to a portion of magnetic core 102 or a substrate disposed on magnetic core 102, such as by applying a thick-film conductive material such as silver. An insulating film may be disposed between adjacent conductive film layers to prevent different portions of windings 118 from shorting together. In embodiments where one or more of windings 118 are multi-turn windings, magnetic material optionally separates two or more winding turns from each other to provided additional paths for leakage magnetic flux, thereby promoting large leakage inductance values.

Arrays 100 and 1400 are shown with windings 118 being foil windings. The rectangular cross section of foil windings helps reduce skin effect induced losses, therefore promoting low winding resistance at high frequencies. However, the coupled inductor arrays disclosed herein are not limited to foil windings. For example, windings 118 could alternately have round or square cross-section, or could alternately be cables formed of multiple conductors. Additionally, while arrays 100 and 1400 are shown as including solder tabs configured for surface mount attachment to a PCB, the coupled inductor arrays disclosed herein could be modified to connect to external circuitry in other manners, such as by using through-hole connections or by coupling to a socket.

Figure 16:
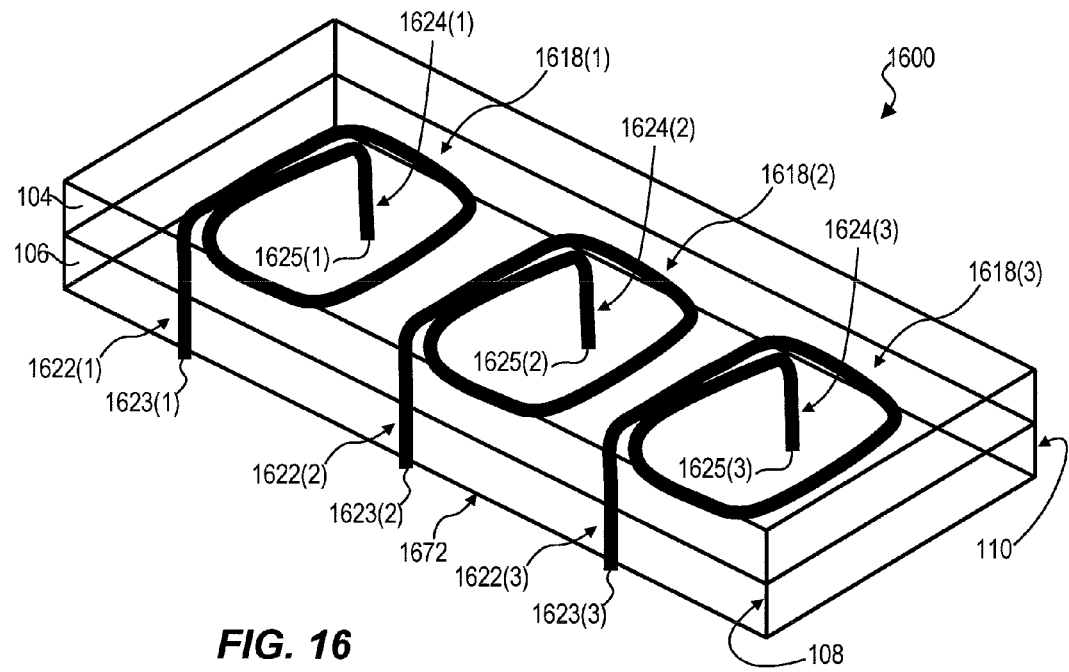
FIG. 16 shows a perspective view of a coupled inductor array similar to that of FIG. 1, but where the windings are wire windings having substantially round cross-section, according to an embodiment.
Figure 17:
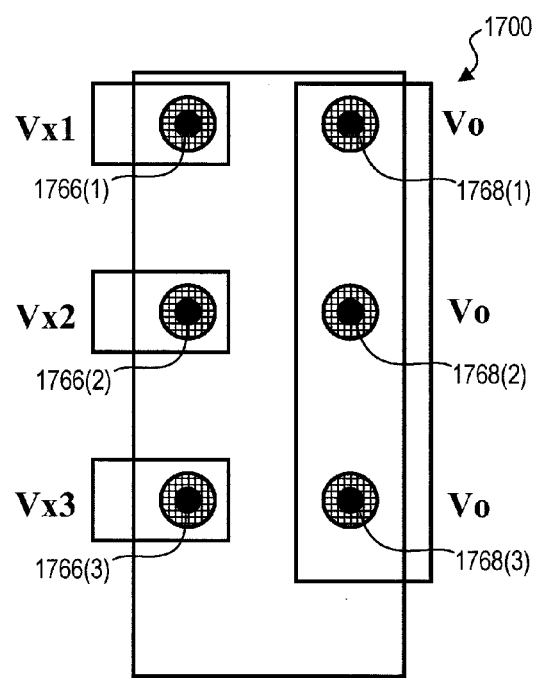
FIG. 17 shows one possible printed circuit board footprint for use with the coupled inductor array of FIG. 16 in a multi-phase buck converter application, according to an embodiment.

For example, FIG. 16 shows a perspective view of a coupled inductor array 1600, which is similar to coupled inductor 100 (FIG. 1), but where foil windings 118 are replaced with wire windings 1618 having substantially round cross-section. Magnetic core 102 is shown as transparent in FIG. 16 to show windings 1618. Opposing first and second ends 1622, 1624 of windings 1618 respectively form first and second through-hold pins 1623, 1625 extending through a bottom surface 1672 of magnetic core 102. FIG. 17 shows a PCB footprint 1700, which is one possible footprint for use with coupled inductor array 1600 in a multi-phase buck converter application, such as buck converter 1200 (FIG. 12). Footprint 1700 includes through-holes 1766 for coupling each through-hole pin 1623 to a respective switching node Vx, as well as through-holes 1768 for coupling through-hole pins 1625 to a common output node Vo.

Figure 18:
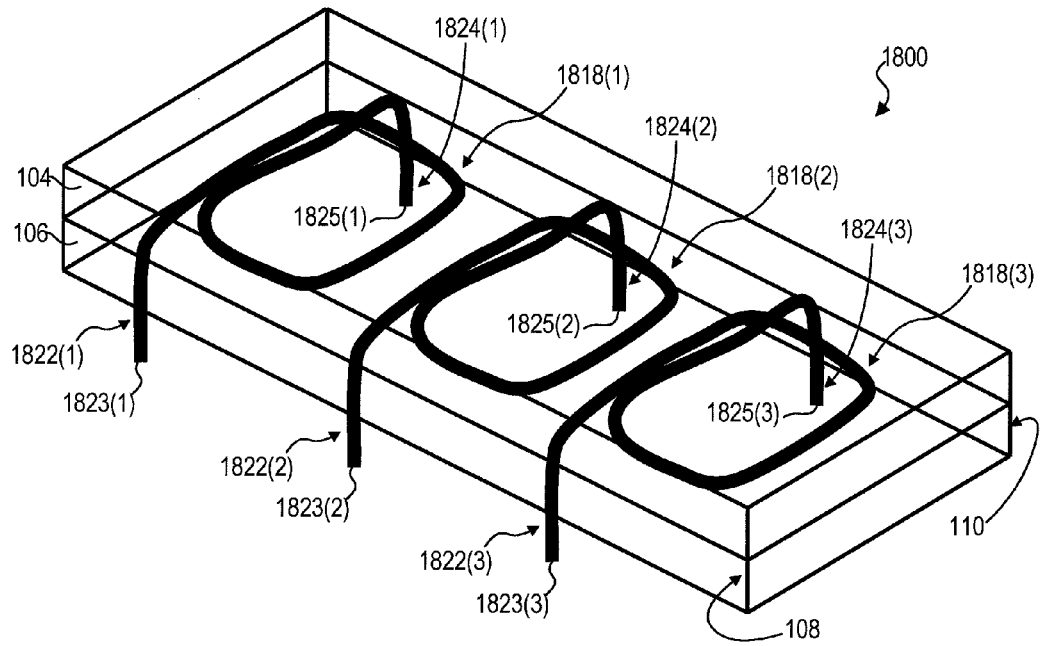
FIG. 18 shows a perspective view of a coupled inductor array similar to that of FIG. 16, but where winding ends extend from opposing core sides, according to an embodiment.
Figure 19:
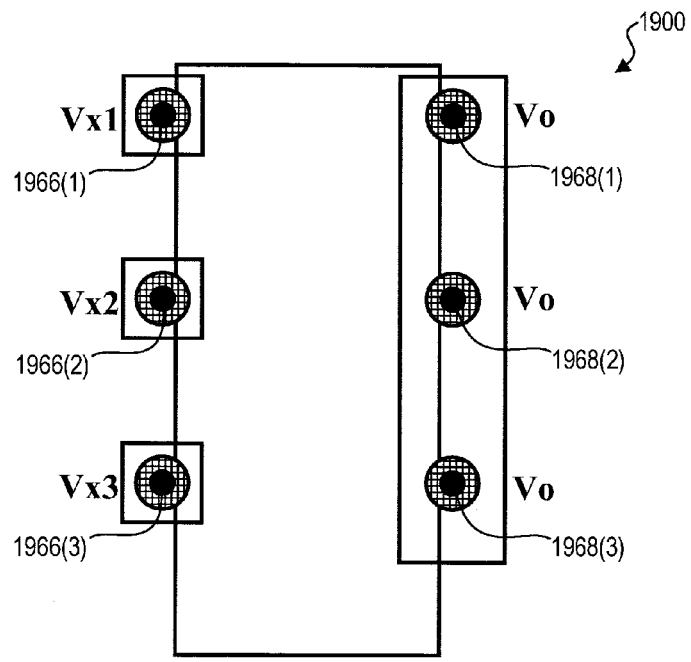
FIG. 19 shows one possible printed circuit board footprint for use with the coupled inductor array of FIG. 18 in a multi-phase buck converter application, according to an embodiment.

As another example, FIG. 18 shows a perspective view of a coupled inductor array 1800, which is similar to coupled inductor array 1600 (FIG. 16), but includes wire windings 1818 having opposing first and second ends 1822, 1824 extending from core sides 108, 110, respectively, to form first and second through-hole pins 1823, 1825. FIG. 19 shows a PCB footprint 1900, which is one possible footprint for use with coupled inductor array 1800 in a multi-phase buck converter application, such as buck converter 1200 (FIG. 12). Footprint 1900 includes through-holes 1966 for coupling each through-hole pin 1823 to a respective switching node Vx, as well as through-holes 1968 for coupling through-hole pins 1825 to a common output node Vo. Array 1800 will typically be not as mechanically robust as array 1600 (FIG. 16) due to array 1800's windings extending from magnetic core 102's sides instead of from magnetic core 102's bottom. However, the fact that through-hole pins 1823, 1825 extend from magnetic core sides 108, 110 may eliminate the need to route PCB conductive traces under magnetic core 102, thereby shortening trace length. Shortening trace length, in turn, reduces trace impedance and associated losses.

Figure 20:
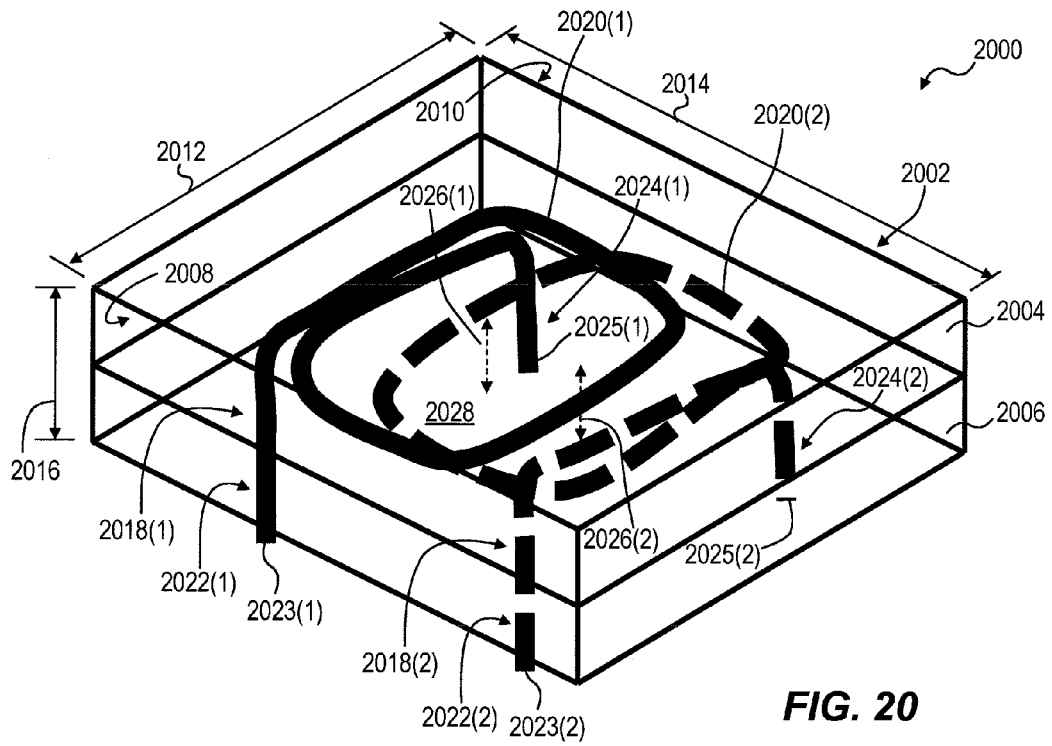
FIG. 20 shows a perspective view of a two-winding coupled inductor array, according to an embodiment.

In embodiments having only two windings, the winding loops may at least partially overlap, thereby helping minimize inductor footprint size. For example, FIG. 20 shows a perspective view of a two-winding coupled inductor array 2000 including partially overlapping winding loops. Coupled inductor array 2000 includes a magnetic core 2002 including top and bottom plates 2004, 2006. Magnetic core 2002 has opposing first and second sides 2008, 2010 separated by a linear separation distance defining a core length 2012. Magnetic core 2002 also has a width 2014 perpendicular to length 2012, as well as a height 2016 perpendicular to both length 2012 and width 2014. Magnetic core 2002 is shown as transparent in FIG. 20.

Coupled inductor array 2000 further includes two windings 2018 disposed in magnetic core 2002 between top and bottom plates 2004, 2006. Although winding 2018(2) is shown by a dashed line to help a viewer distinguish between windings 2018(1), 2018(2), in actuality, both windings typically have the same configuration. Each winding 2018 passes through magnetic core 2002 in the lengthwise 2012 direction and forms a loop 2020 in magnetic core 2002. Loops 2020 are generally planar in typical embodiments. Although loops 2020 are shown as forming a single turn, they may alternately form two or more turns to promote low magnetic flux density and associated low core losses. Opposing first and second ends 2022, 2024 of windings 2018 extend towards core first and second sides 2008, 2010, respectively. Each first end 2022 forms a respective first through-hole pin 2023, and each second end 2024 forms a respective second through-hole pin 2025. In certain alternate embodiments, winding ends 2022, 2024 are adapted to connect to external circuitry in other manners. For example, winding ends 2022, 2024 form respective solder tabs configured for surface mount attachment to a PCB in some alternate embodiments.

Each loop 2020 is wound around a respective winding axis 2026. Loops 2020 are wound in opposing directions to achieve inverse magnetic coupling. Such inverse magnetic coupling is characterized in array 2000, for example, by current of increasing magnitude flowing into winding 2018(1) from core first side 2008 inducing a current of increasing magnitude flowing into winding 2018(2) from core first side 2008. Each winding axis 2026 is generally parallel to but offset from each other winding axis 2026 in the widthwise 2014 direction. Both loops 2020 are partially overlapping so that the two loops enclose a common area 2028 within magnetic core 2002. Magnetizing and leakage inductance values can be adjusted during coupled inductor array 2000 design and/or manufacture by adjusting the extent to which winding loops 2020 overlap, or in other words, by adjusting the size of area 2028 enclosed by both loops. In particular, leakage inductance will increase and magnetizing inductance will decrease as winding loops 2020 are separated from each other so that area 2028 size decreases. Conversely, leakage inductance will decrease and magnetizing inductance will increase as winding loops 2020 are brought closer together so that area 2028 size increases.

Leakage inductance and/or magnetizing inductance can also be adjusted during inductor design and/or manufacture by adding one or more coupling teeth and/or one or more leakage teeth in a manner similar to that discussed above with respect to FIGS. 8-11. For example, magnetizing and leakage inductance could be increased by adding a leakage tooth connecting top and bottom plates 2004, 2006 in area 2028 enclosed by both winding loops 2020. As another example, leakage inductance could be increased by adding a coupling tooth connecting top and bottom plates 2004, 2006 outside of area 2028. Leakage inductance and/or magnetizing inductance could also be varied during array design and/or manufacture by using techniques similar to those discussed above with respect to array 100, such as by varying winding loop 2020 size, winding loop 2020 geometry, magnetic core 2002 composition, and/or spacing between top and bottom plates 2004, 2006.

Figure 21:
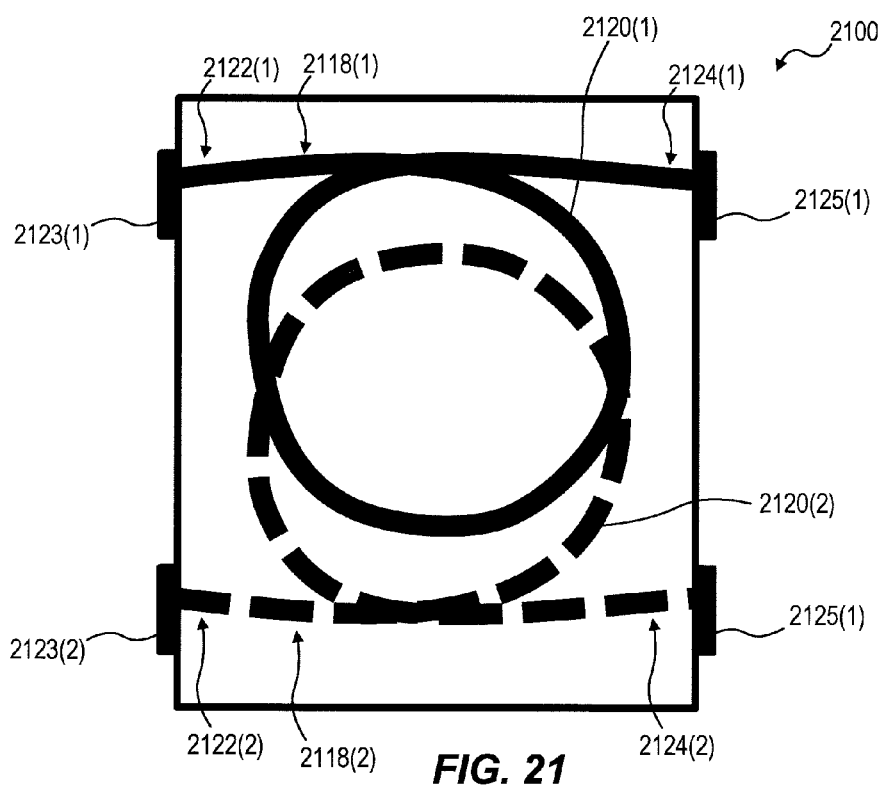
FIG. 21 shows a top plan view of an alternate embodiment of the FIG. 20 coupled inductor array with a top plate removed and with circular winding loops.

For example, FIG. 21 shows a top plan view of a coupled inductor array 2100 with its top plate removed. Array 2100 is similar to array 2000 of FIG. 20 but with winding loops 2120 having substantially circular shape instead of substantially rectangular shape. The circular shape helps reduce winding 2118 length, thereby reducing winding impedance. However, the circular shape reduces the portion of winding loops 2120 that overlap, thereby decreasing magnetizing inductance and increasing leakage inductance. While winding 2118(2) is shown as a dashed line to help a viewer distinguish between windings 2118(1) and 2118(2), in actuality, both windings typically have the same configuration. Array 2100 also differs from array 2000 in that opposing winding ends 2122, 2124 are electrically coupled to respective solder tabs 2123, 2125, instead of forming through-hole pins.

The configuration of magnetic core 2002 (FIG. 20) can be varied in manners similar to that discussed above with respect to array 1000. For example, top and bottom plates 2004, 2006 could alternately be part of a single piece magnetic element. As another example, in some alternate embodiments, magnetic core 2002 is a single piece monolithic structure with windings 2018 embedded therein, such as a core formed by molding a composition including magnetic material in a binder. As yet another example, in certain alternate embodiments, magnetic core 2002 is formed by disposing a plurality of layers or films of magnetic material. Additionally, in some alternate embodiments, magnetic core 2002 completely surrounds winding loops 2020.

Figure 22:
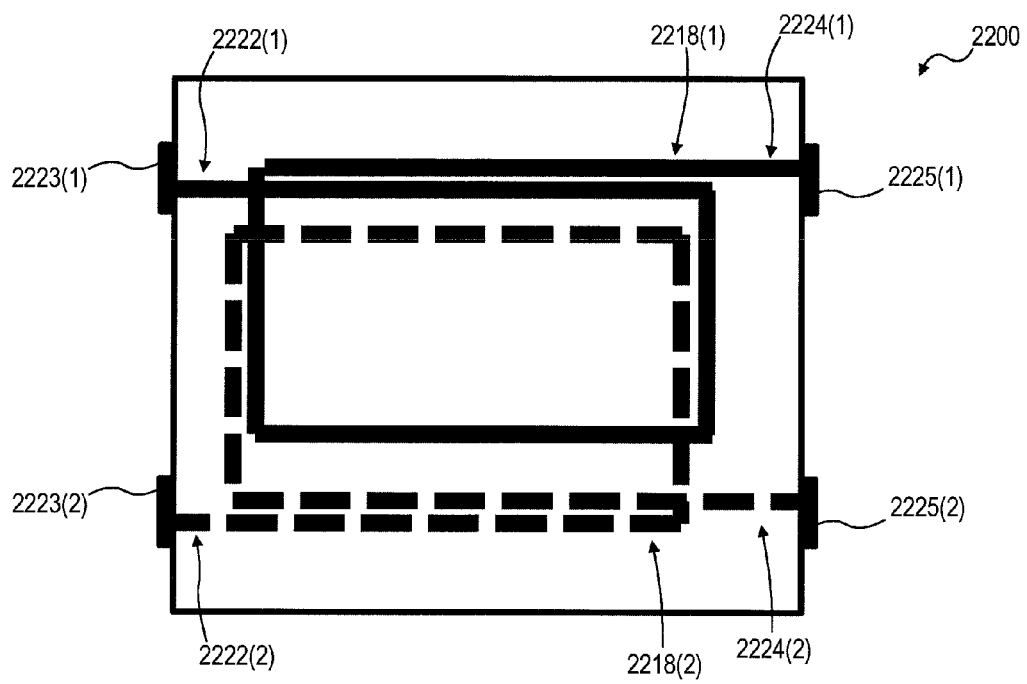
FIG. 22 shows a top plan view of an alternate embodiment of the FIG. 20 coupled inductor array with a top plate removed and with windings formed of conductive film.

Furthermore, the configuration of windings 2018 could be varied. For example, wire winding 2018 could be replaced with foil windings or conductive film. For example, FIG. 22 shows a top plan view of a coupled inductor array 2200 with its top plate removed. Array 2200 is similar to array 2000 of FIG. 20 but includes windings 2218 formed of conductive film. At least overlapping portions of windings 2218 are insulated from each other, such as by an insulated film (not shown) disposed between overlapping winding portions. In contrast to array 2000, windings ends 2222, 2224 electrically couple to respective solder tabs 2223, 2225, instead of forming through-hole pins.

The configuration of the coupled inductor arrays disclosed herein promotes low height of the arrays, such that certain embodiments may be considered to be "chip-style" coupled inductor arrays. For example, certain embodiments have a height 116 (FIG. 1) of 0.8 millimeters or less.

Figure 24:
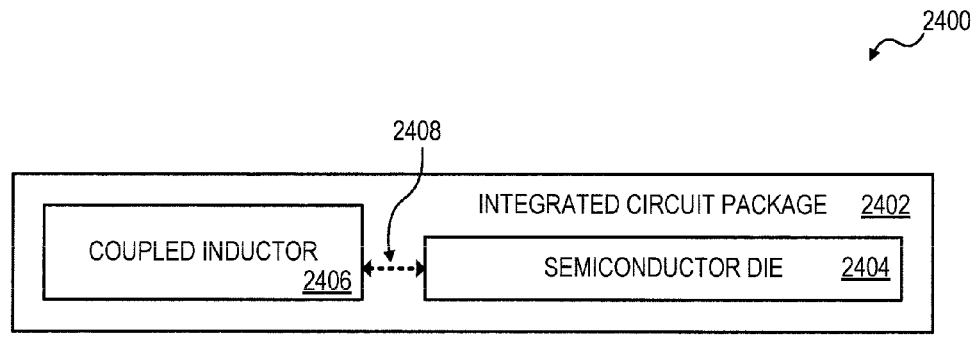
FIG. 24 shows an electronic device, according to an embodiment.
Figure 25:
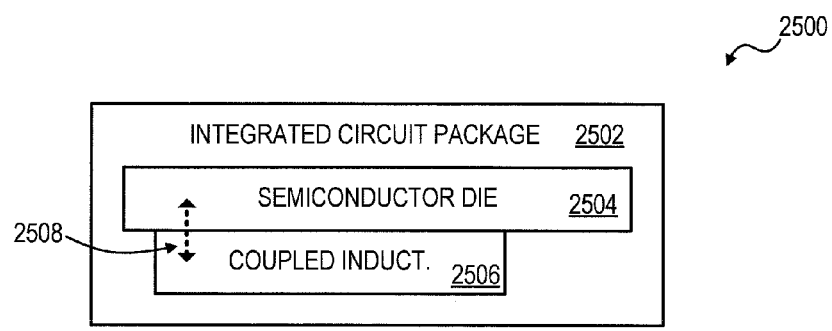
FIG. 25 shows another electronic device, according to an embodiment.

The relatively low height of such arrays may enable them to be housed in an integrated circuit package with a semiconductor die or bar and optionally electrically coupled to the semiconductor die or bar. For example, certain embodiments of the arrays may be housed in a common integrated circuit package with a semiconductor die, but physically separated from the die within the package. Additionally, certain other embodiments of the coupled inductor arrays disclosed herein are formed on a semiconductor die, such as by disposing a number of layers of magnetic and conductive material on a semiconductor die to respectively form the magnetic core and windings. The semiconductor die and the coupled inductor array, in turn, are optionally housed in a common integrated circuit package, and the coupled inductor is optionally electrically coupled to the semiconductor die. For example, FIG. 24 shows an electronic device 2400 including an integrated circuit package 2402, a semiconductor die 2404 housed in integrated circuit package 2402, and a coupled inductor 2406 housed in integrated circuit package 2402. Coupled inductor 2406 is electrically coupled to semiconductor die 2404, as symbolically illustrated by dashed line 2408. As another example, FIG. 25 shows an electronic device 2500 including an integrated circuit package 2502, a semiconductor die 2504 housed in integrated circuit package 2502, and a coupled inductor 2506 housed in integrated circuit package 2502. Coupled inductor 2506 is disposed on semiconductor die 2504, and coupled inductor 2506 is electrically coupled to semiconductor die 2504, as symbolically illustrated by dashed line 2508.

The examples discussed above show solder tabs being disposed on the coupled inductor array bottom surfaces but not on the array top surfaces. Such configuration may be advantageous in applications where it is desirable that the array top surface being electrically isolated, such as if an optional heat sink is to be disposed on the top surface.

Figure 23:
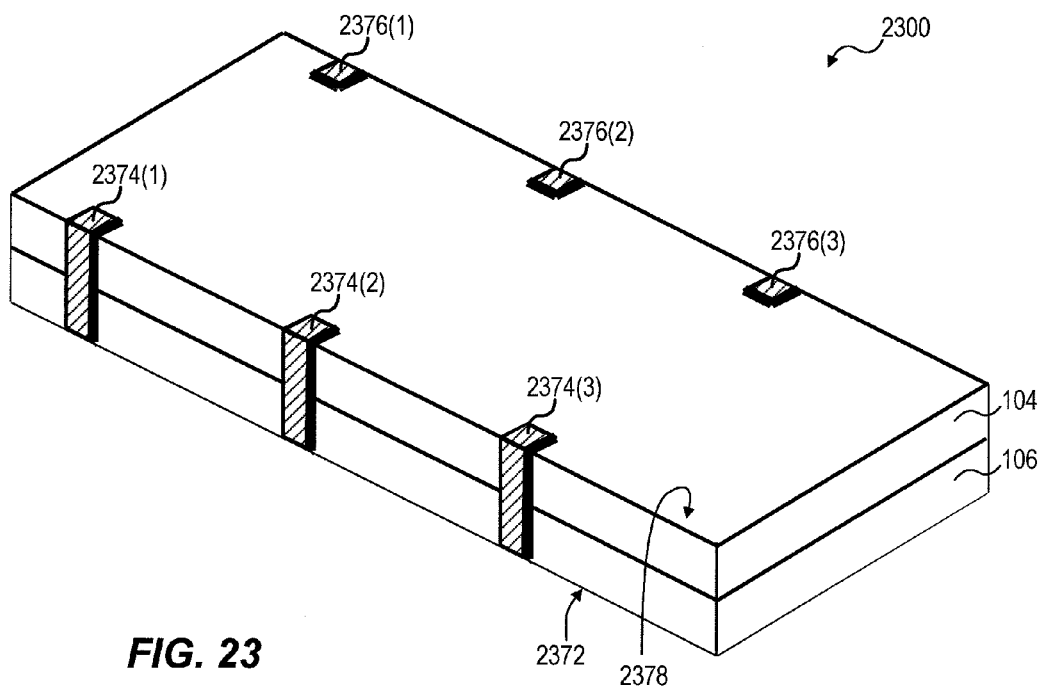
FIG. 23 shows a perspective view of a coupled inductor array similar to that of FIG. 1, but with solder tabs on both its top and bottom surfaces, according to an embodiment.

However, certain alternate embodiments include solder tabs on both the top and bottom surfaces of the array. For example, FIG. 23 shows a perspective view of a coupled inductor array 2300, which is similar to coupled inductor array 100 (FIG. 1), but further including solder tabs 2374, 2376 disposed on a top surface 2378, as well as solder tabs 123 (not visible in the FIG. 23 perspective view) disposed on a bottom surface 2372.

Applicant has additionally discovered that particular attention must be paid to winding geometry and relative winding position in embodiments where the magnetic core is formed of a magnetic material having a distributed gap, such as a material including magnetic powder within a binder, to ensure significant magnetic coupling of the windings. As discussed above and as also discussed in Schultz, windings must be strongly magnetically coupled in switching power converter applications to realize the advantages of using a coupled inductor instead of multiple discrete inductors.

Figure 26:
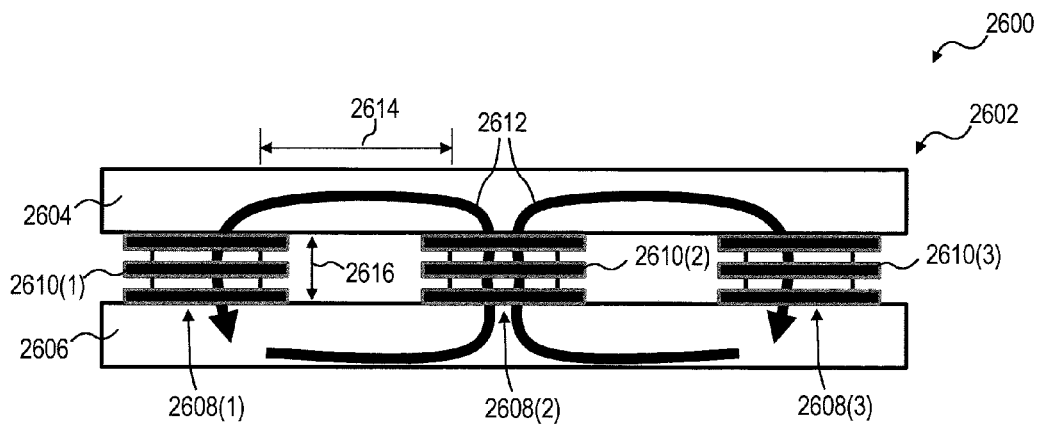
FIG. 26 is a side elevational view of a prior-art coupled inductor including a ladder magnetic core formed of a ferrite magnetic material.

To help appreciate the special considerations that must be taken when using a magnetic core formed of a distributed gap magnetic material, first consider prior art coupled inductor 2600 of FIG. 26, which includes a magnetic core 2602 formed of ferrite material, instead of a magnetic core formed of a magnetic material having a distributed air gap. Magnetic core 2602 is a "ladder" magnetic core including opposing rails 2604, 2606 and three rungs 2608. A respective winding 2610 is wound around each rung 2608. As known in art of magnetics, ferrite magnetic materials have very high relative permeabilities, often in the range of 2,000 to 3,000, and ferrite magnetic materials therefore have low reluctances. Consequentially, magnetic core 2602 has a low reluctance, and magnetic flux generated by current flowing through one or more windings 2610 will be confined almost exclusively to magnetic core 2602. For example, arrows 2612 in FIG. 26 symbolically illustrate how magnetic flux generated by current flowing through winding 2610(2) will flow almost exclusively within magnetic core 2602 to couple to windings 2610(1) and 2610(3). Accordingly, windings 2610 are strongly magnetically coupled even if spacing 2614 between adjacent rungs, or spacing 2616 between rails 2604 and 2606, is large.

Figure 27:
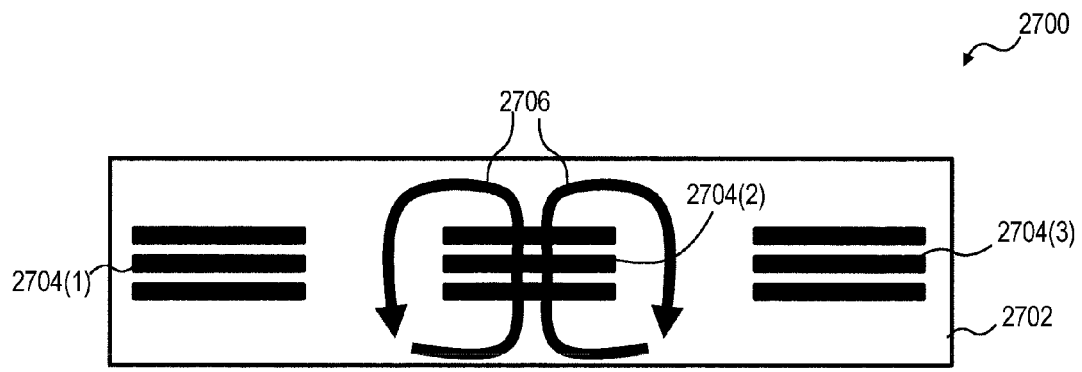
FIG. 27 shows a side cross-sectional view of a prior-art magnetic device.
Figure 28:
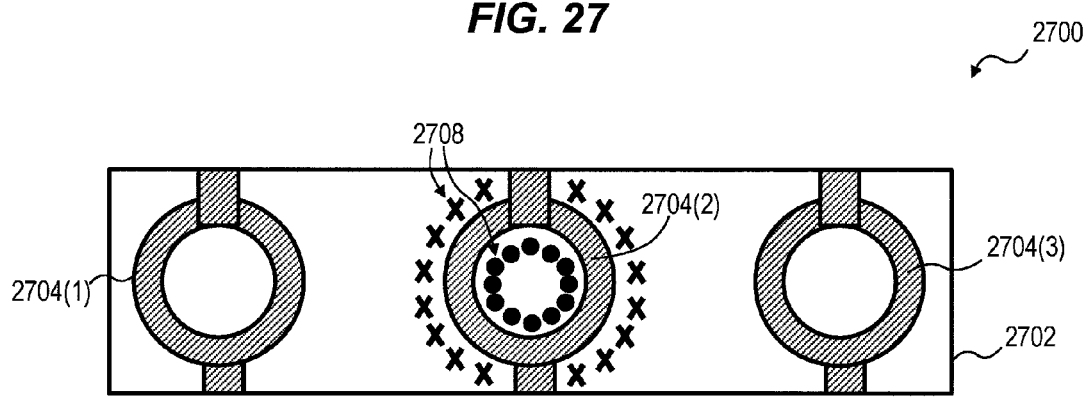
FIG. 28 shows a top cross-sectional view of the FIG. 27 prior-art magnetic device.

Now consider a prior art magnetic device 2700, shown in FIGS. 27 and 28, which includes a monolithic magnetic core 2702 formed of a magnetic material having a distributed gap. FIG. 27 shows a side cross-sectional view of magnetic device 2700, and FIG. 28 shows a top cross-sectional view of magnetic device 2700. Three windings 2704 are embedded in monolithic magnetic core 2702, and each winding 2704 forms a circular loop. Distributed gap magnetic materials have magnetic permeabilities that are larger than that of air. However, the distributed gap causes these magnetic materials to have magnetic permeabilities that are much smaller than those of ferrite magnetic materials. Consequentially, magnetic core 2702 has a relatively large reluctance, and magnetic flux generated by current flowing through one winding 2704 will therefore flow very close to the winding and not materially couple to other windings 2704. For example, arrows 2706 in FIG. 27, and symbols 2708 in FIG. 28, symbolically illustrate how magnetic flux generated by current flowing through winding 2704(2) does not significantly couple to windings 2704(1) and 2704(3). Accordingly, magnetic device 2700 is merely a collection of three independent inductors which are not appreciably magnetically coupled, and magnetic device 2700 cannot be considered a coupled inductor array.

Figure 29:
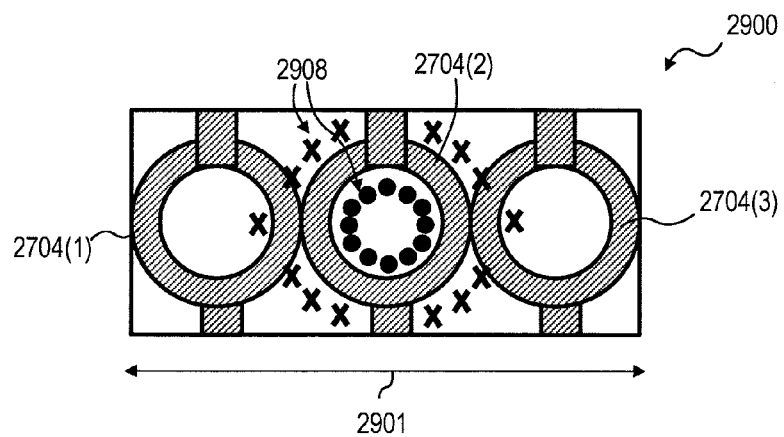
FIG. 29 shows a top cross-sectional view of a magnetic device where the windings are close together.

Furthermore, even if magnetic device 2700 were modified such that windings 2704 were closer together, windings 2704 still would not be significantly magnetically coupled. For example, FIG. 29 shows a top cross-sectional view of a magnetic device 2900, which is similar to magnetic device 2700 of FIGS. 27 and 28, but where windings 2704 are very close together in a widthwise 2901 direction. Symbols 2908 symbolically illustrate the paths of magnetic flux generated by current flowing through winding 2704(2). As illustrated, little of magnetic flux from winding 2704(2) couples to remaining windings 2704(1) and 2704(3), even though windings 2704 are close together. Accordingly, magnetic device 2900 is still merely a collection of three independent inductors which are not appreciably magnetically coupled, and magnetic device 2900 therefore cannot be considered a coupled inductor array.

Applicant has discovered, however, that both strong magnetic coupling and relatively large leakage inductance values can be realized in devices including a monolithic magnetic core having a distributed gap if (1) the windings are longer in the lengthwise direction than in widthwise direction, such as discussed above with respect to FIGS. 1-4, so that the windings form winding loops enclosing substantially rectangular loop areas, and (2) area enclosed by winding loops is substantially greater than area outside of the winding loops, in a given lengthwise by widthwise cross-section of the magnetic core.

Figure 30:
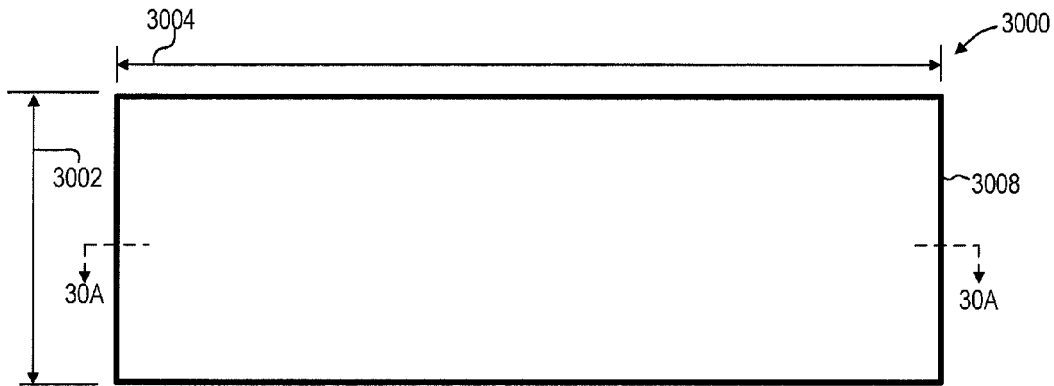
FIG. 30 is a top plan view of a coupled inductor array including a monolithic magnetic core formed of a magnetic material having a distributed gap, according to an embodiment.
Figure 31:
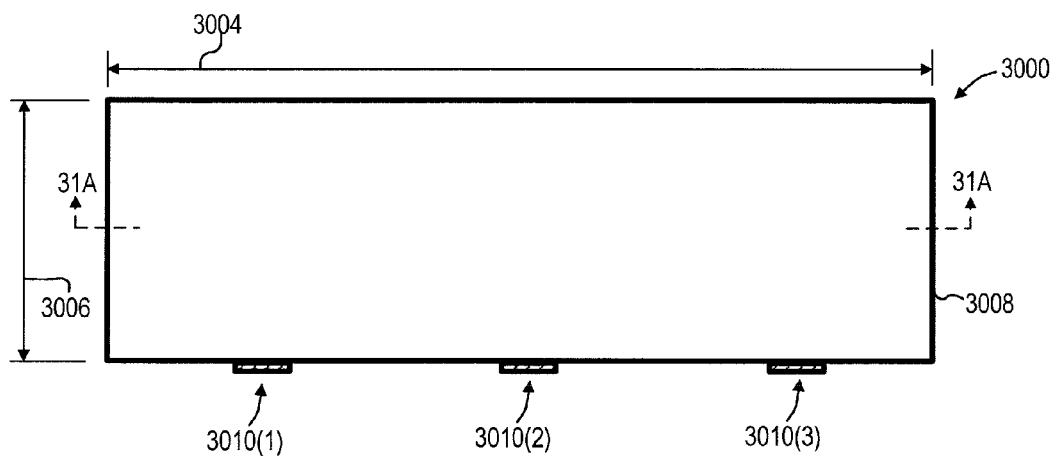
FIG. 31 is a side elevational view of the FIG. 30 coupled inductor array.
Figure 32:
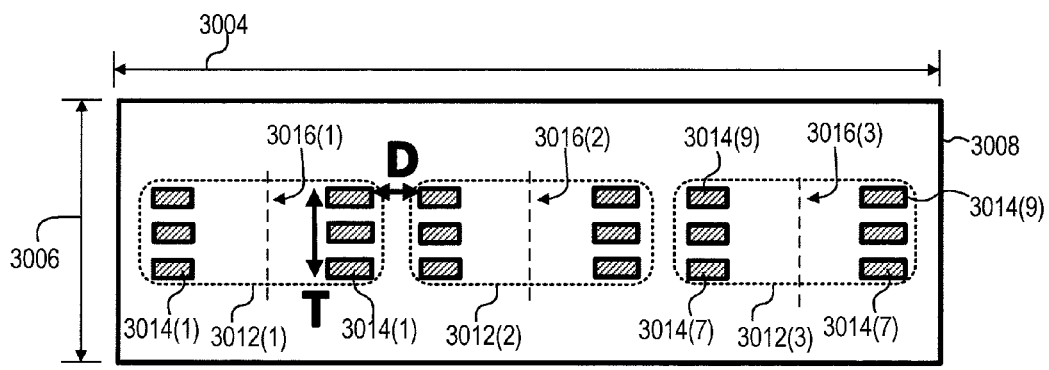
FIG. 32 is a cross-sectional view taken along line 30A-30A of FIG. 30.
Figure 33:
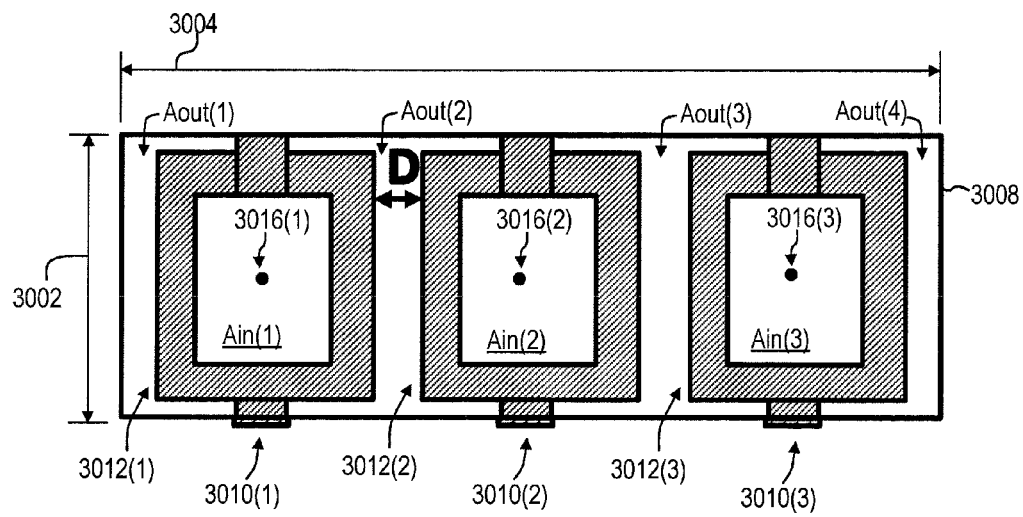
FIG. 33 is a cross-sectional view taken along line 31A-31A of FIG. 31.

FIGS. 30 through 33 illustrate one example of a magnetic device meeting these requirements. In particular, FIG. 30 is a top plan view, and FIG. 31 is a side elevational view, of a coupled inductor array 3000 having a length 3002, a width 3004, and a height 3006. FIG. 32 is a cross-sectional view taken along line 30A-30A of FIG. 30, and FIG. 33 is a cross-sectional view taken along line 31A-31A of FIG. 31. One possible application of coupled inductor array 3000 is in a switching power converter application, such as in three-phase buck converter 1200 of FIG. 12.

Coupled inductor array 3000 includes a monolithic magnetic core 3008 formed of a magnetic material having a distributed gap. For example, in some embodiments, monolithic magnetic core 3008 is formed of a single block of powdered magnetic material within a binder. As another example, in some other embodiments, monolithic magnetic core 3008 is formed from a plurality of layers of magnetic film stacked to form a monolithic magnetic core, where each magnetic film layer is formed of powder magnetic material within a binder. The distributed gap of monolithic magnetic core 3008 causes magnetic core 3008 to have a magnetic permeability that is much lower than that of typical ferrite magnetic materials.

Coupled inductor array 3000 includes a plurality of windings 3010 embedded within monolithic magnetic core 3008, where each winding forms a respective winding loop 3012 of one or more turns around a respective winding axis 3016, where each winding axis 3016 extends in the height direction. Each winding loop 3012 includes a plurality of conductor layers 3014 separated from each other in the height direction, such that each winding loop 3012 has a thickness T in the height direction. Only some conductor layers 3014 are labeled in FIG. 32 to promote illustrative clarity. Conductor layers 3014 of each winding loop 3012 are electrically coupled in series by electrical connectors (not shown), such as conductive vias extending between adjacent conductor layers 3014 in the height direction. Adjacent winding loops 3012 are separated from each other by a widthwise separation distance D.

Each winding loop 3012 encloses a respective lengthwise by widthwise loop area Ain having a substantially rectangular shape that is elongated in the lengthwise direction (see FIG. 33). Areas of magnetic core 3008 enclosed by winding loops 3012 are substantially greater than areas of magnetic core 3008 outside of winding loops 3012, as seen when coupled inductor array 3000 is viewed cross-sectional in the height direction. In other words, the collective size of magnetic core areas Ain enclosed by winding loops 3012 is significantly greater than the collective size of magnetic core areas Aout outside of winding loops 3012, in a given length by width cross-sectional plane including winding loops 3012. This relationship between winding loop geometry, winding loop location, and magnetic core 3008 allows magnetic core 3008 to provide a low reluctance path between adjacent winding loops 3012, even though magnetic core 3008 has a relatively low magnetic permeability. Consequentially, winding loops 3012 are strongly magnetically coupled such that they are part of a coupled inductor array, instead of being merely part of a collection of independent inductors.

Furthermore, the fact that magnetic core 3008 extends beyond winding loops 3012 in the length by width directions results in magnetic core 3008 providing paths for leakage magnetic flux around substantially all of a respective perimeter of each winding loop 3012. Thus, coupled inductor array 3000 has wide, or large cross-sectional area, leakage magnetic flux paths. The large cross-sectional area of the leakage magnetic flux paths causes the paths to have low reluctances, thereby promoting low cores losses and large leakage inductance values associated with windings 3010. Accordingly, coupled inductor array 3000 achieves both strong magnetic coupling of windings 3010 and significant leakage inductance values associated with windings 3010, even though magnetic core 3008 has a relatively low magnetic permeability.

Modifications can be made to coupled inductor array 3000 without departing from the scope hereof. For example, the number of windings 3010 can be varied, as long as coupled inductor array 3000 includes at least two windings 3010. As another example, the number of conductor layers 3014 in each winding loop 3012 may be varied, as long as each winding loop 3012 includes at least one conductor layer 3014. Additionally, although magnetic core 3008 is illustrated as being homogenous, magnetic core 3008 could alternately be a composite magnetic core having two or more portions of different compositions, as long as the majority of magnetic core 3008's volume is formed of a magnetic material having a distributed gap. Furthermore, while it is anticipated that coupled inductor array 3000 will typically be symmetrical, in some alternate embodiments, coupled inductor array 3000 has an asymmetrical construction, such as to realize an asymmetrical coupled inductor array.

Figure 34:
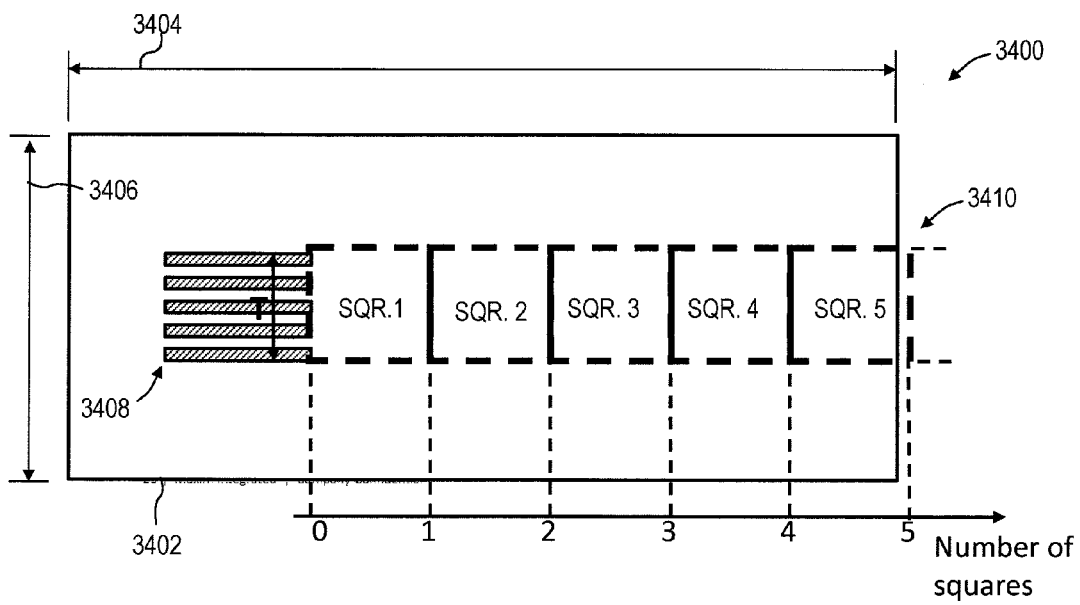
FIG. 34 is a cross-sectional view of a magnetic device.

Applicant has further determined that both strong magnetic coupling and significant leakage inductance are promoted in distributed gap magnetic devices if widthwise winding loop separation distance has a certain relationship to winding loop height. To help appreciate this relationship, consider a magnetic device 3400 shown in cross-sectional view in FIG. 34. Magnetic device 3400 includes a rectangular, monolithic magnetic core 3402 formed of a magnetic material having a distributed gap, such as powdered magnetic material within a binder. Magnetic device 3400 has a length 3404 and a height 3406, and magnetic device 3400 includes a multi-turn winding loop 3408 embedded in monolithic magnetic core 3402, where winding loop 3408 has a height T.

Figure 35:
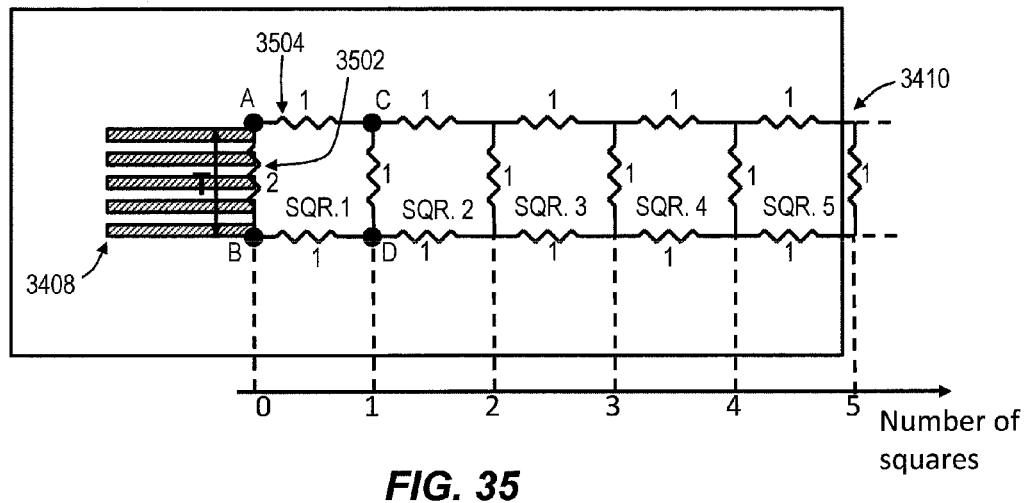
FIG. 35 illustrates the magnetic device of FIG. 34 with an equivalent electrical model projected thereon.

Magnetic core 3402 can be modeled by dividing a length by height cross-section into imaginary squares, such as a length by height cross-section 3410 including squares 1-5. While such model is approximate and only considers a portion of monolithic magnetic core 3402, the model is illustrative in the sense that it gives an idea of how fast magnetic flux density decreases with increasing distance from winding loop 3408. Ignoring boundary conditions and second order effects, reluctance between vertexes of the squares can be modeled by an equivalent electrical model, as shown in FIG. 35, where each resistor represents normalized reluctance between two vertexes. For example, the path from point A to point B has approximately twice the reluctance of the path from point A to point C, as shown by resistor 3502 having twice the resistance of resistor 3504.

Figure 36:
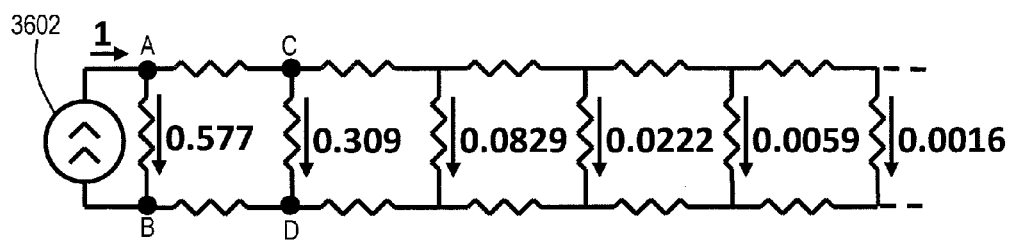
FIG. 36 is an electrical model representing magnetic flux flowing through a cross-section of the FIG. 34 magnetic device.
Figure 37:
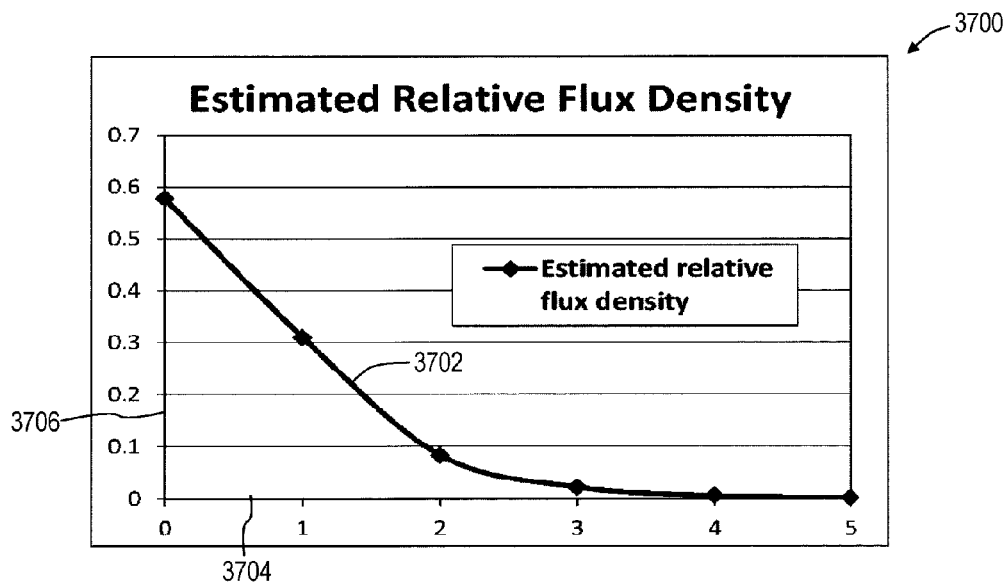
FIG. 37 is a graph illustrating relative magnetic flux density in the cross-section of the FIG. 34 magnetic device.

Magnetic flux through cross-section 3410 can be approximately modeled as shown in FIG. 36, where total magnetic flux flowing through cross-section 3410 is represented by a current source 3602 having an amplitude of 1. Current flowing through each electrical branch in FIG. 36 represents relative magnetic flux flowing through a corresponding path of magnetic core 3402, when cross-section 3410 is approximated by discrete paths defined by the boundaries of squares 1-5. For example, approximately 55.7% of total magnetic flux within cross-section 3410 flows between points A and B, while only about 30.9% of total magnetic flux flows between points C and D. FIG. 37 is a graph 3700 of relative magnetic flux density in cross-section 3410 and is derived from FIG. 36, where area under curve 3702 represents total magnetic flux within cross-section 3410. Horizontal axis 3704 designates which square (e.g., square 1) in cross-section 3410 that magnetic flux is flowing through, and vertical axis 3706 represents estimated relative magnetic flux density within the square.

As shown in FIG. 37, most magnetic flux flowing through cross-section 3410 flows within square 1. As a result, any additional winding loop (not shown) would also need to be located within square 1 for the additional winding loop to be strongly magnetically coupled to winding loop 3408. This constraint is satisfied in coupled inductor array 3000 of FIGS. 30-33 if D is less than T. Accordingly, in some embodiments of coupled inductor array 3000, each widthwise separation distance D is less than thickness T of winding loops 3012, to further realize strong magnetic coupling of winding loops 3012.

While strong magnetic coupling is required in coupled inductor arrays, some leakage inductance is also necessary for energy storage. Thus, separation distance D should be at least 10% of winding loop thickness T in typical embodiments, to provide sufficient lengthwise by widthwise cross-sectional area for leakage magnetic flux. Additionally, separation distance D should be sufficiently large to avoid manufacturing difficulties associated with very small values of separation distance D. For example, if a manufacturing process has a mechanical accuracy tolerance of +/−dD, D should be at least twice dD, to promote robust manufacturing. Accordingly, in some embodiments of coupled inductor array 3000, D is less than T, and D is greater than the larger of 0.1*T or 2*dD, to achieve strong magnetic coupling, significant leakage inductance values, and robust manufacturing.

In some coupled inductor array applications, it may be desirable to have very strong magnetic coupling of windings. Accordingly, Applicant has developed additional techniques which promote strong magnetic coupling of windings in coupled inductor arrays having distributed gap magnetic cores, with a tradeoff of increased leakage magnetic flux path reluctance.

Figure 38:
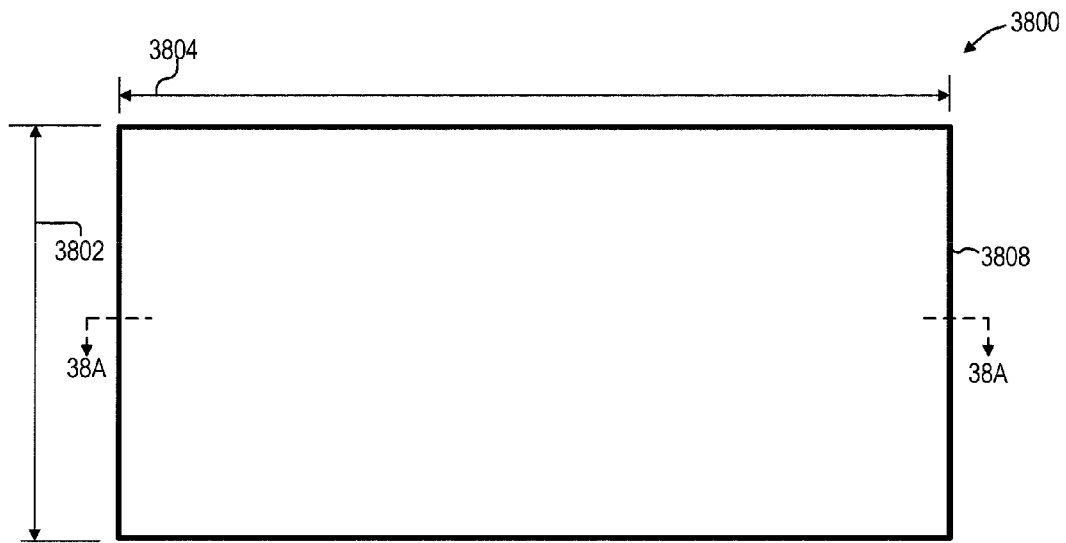
FIG. 38 is a top plan view of a coupled inductor array including a multilayer film magnetic core including non-magnetic structures embodied in the monolithic magnetic core, according to an embodiment.
Figure 39:
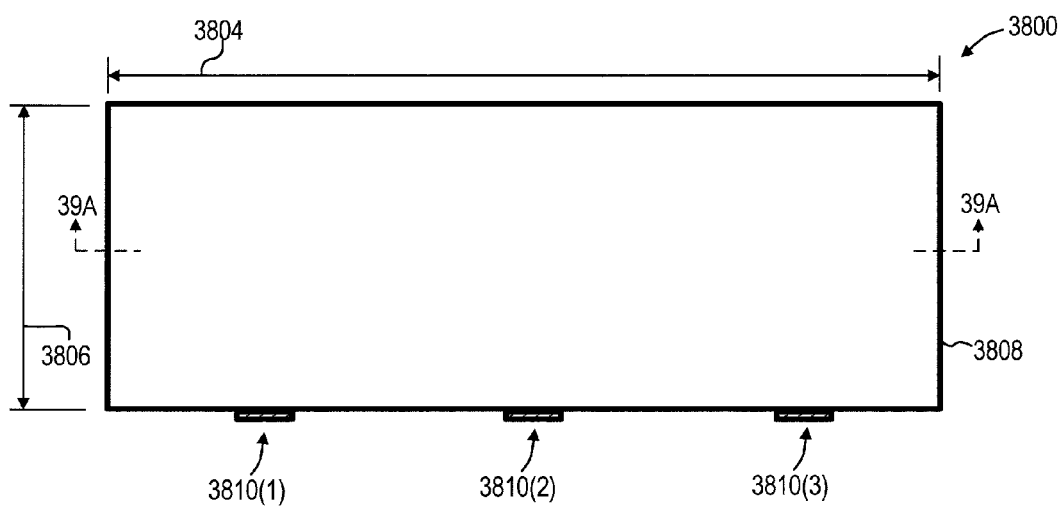
FIG. 39 is a side elevational view of the FIG. 38 coupled inductor array.
Figure 40:
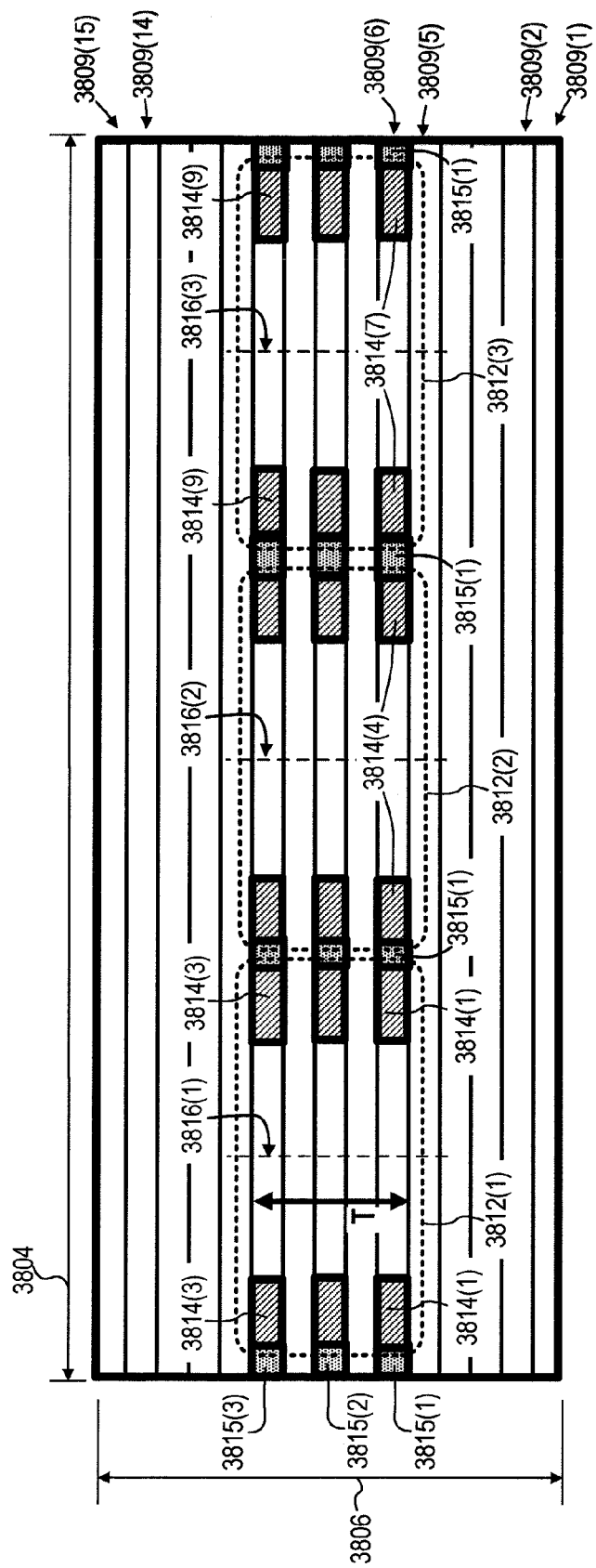
FIG. 40 is a cross-sectional view of the FIG. 38 coupled inductor array taken along line 38A-38A of FIG. 38.
Figure 41:
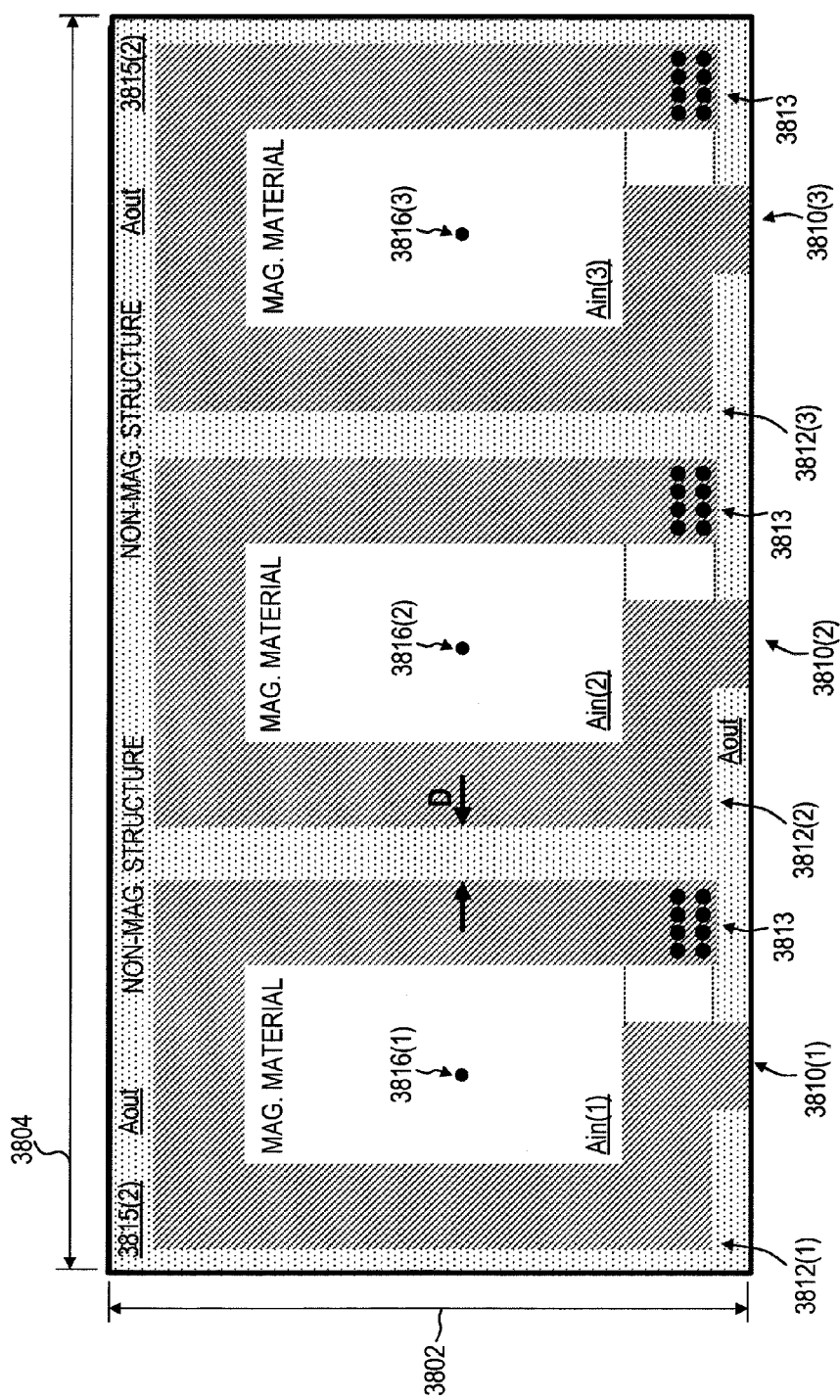
FIG. 41 is a cross-sectional view of the FIG. 38 coupled inductor array taken along line 39A-39A of FIG. 39.

In particular, Applicant has discovered that strong magnetic coupling of winding loops in coupled inductor arrays having distributed gap magnetic cores can be further achieved by embedding non-magnetic structures in the magnetic core to impede flow of magnetic flux around the winding loops. For example, FIG. 38 is a top plan view, and FIG. 39 is a side plan view, of a coupled inductor array 3800 including non-magnetic structures embedded in a monolithic magnetic core. Coupled inductor array 3800 has a length 3802, a width 3804, and a height 3806. FIG. 40 is a cross-sectional view taken along line 38A-38A of FIG. 38, and FIG. 41 is a cross-sectional view taken along line 39A-39A of FIG. 39. One possible application of coupled inductor array 3800 is in a switching power converter application, such as in three-phase buck converter 1200 of FIG. 12.

Coupled inductor array 3800 includes a monolithic magnetic core 3808 having a distributed gap. In the illustrated example, magnetic core 3808 is formed of a plurality of magnetic film layers 3809 stacked in the height direction (see FIG. 40), where each magnetic film layer is formed of a magnetic material having a distributed gap, such as powdered magnetic material within a binder. In some alternate embodiments, however, monolithic magnetic core 3808 is a block magnetic core formed of a distributed gap material, such as powdered magnetic material within a binder.

Coupled inductor array 3800 includes a plurality of windings 3810 embedded within monolithic magnetic core 3808, where each winding forms a respective winding loop 3812 of one or more turns wound around a respective axis 3816, where each winding axis 3816 extends in the height direction. Each winding loop 3812 includes a plurality of conductor layers 3814 separated from each other in the height direction, such that each winding loop 3812 has a thickness T in the height direction. Only some conductor layers 3814 are labeled in FIG. 40 to promote illustrative clarity. Conductor layers 3814 of each winding loop 3812 are electrically coupled in series by electrical connectors, such as conductive vias 3813 extending between adjacent conductor layers 3814 in the height direction. Outlines of winding loops 3812 are partially shown by dashed lines in FIG. 41 where conductor layers 3814 of the winding loops are not visible in the FIG. 41 cross-sectional view. Adjacent winding loops 3812 are separated from each other by a widthwise separation distance D.

Each winding loop 3812 encloses a respective lengthwise by widthwise loop area Ain having a substantially rectangular shape that is elongated in the lengthwise direction (see FIG. 41). Areas of magnetic core 3808 enclosed by winding loops 3812 are substantially greater than areas of magnetic core 3808 outside of winding loops 3812, as seen when coupled inductor array 3800 is viewed cross-sectional in the height direction. Thus, the collective size of loop areas Ain is significantly greater than the collective size of areas Aout of magnetic core 3808 which are outside of winding loops 3812, in a given length by width cross-sectional plane including winding loops 3812. Consequentially, winding loops 3812 are strongly magnetically coupled so that windings 3810 are part of a coupled inductor array, instead of merely part of a collection of independent inductors, in a manner similar to that discussed above with respect to FIGS. 30-33. Furthermore, in some embodiments, D is less than T, and D is greater than the larger of 0.1*T or 2*dD, to achieve strong magnetic coupling, significant leakage inductance values, and robust manufacturing, in a manner similar to that discussed above.

Non-magnetic structures 3815 are embedded within monolithic magnetic core and disposed outside of winding loops 3812, as seen when coupled inductor array 3800 is viewed cross-sectionally in the height direction. In particular, one or more non-magnetic structure 3815 are disposed adjacent to each winding loop 3812 in a common lengthwise by widthwise plane as the winding loop, such that lengthwise by widthwise areas of magnetic core 3808 outside of winding loops 3812 are at least substantially covered by non-magnetic structures 3815. Non-magnetic structures 3815 impede flow of magnetic flux outside of the winding loops within magnetic core 3808, thereby further promoting strong magnetic coupling of windings 3810. Although it is anticipated that non-magnetic structures 3815 will typically cover substantially all of a lengthwise by widthwise area outside of winding loop 3812, as seen when coupled inductor array 3800 is viewed cross-sectionally in the height direction, non-magnetic structures 3815 could alternately cover a smaller lengthwise by widthwise area of magnetic core 3808, without departing from the scope hereof.

Modifications may be made to coupled inductor array 3800 without departing from the scope hereof. For example, the number of magnetic films layers 3809 may be varied. As another example, the number of non-magnetic structures 3815 can be varied. For example, a given non-magnetic structure 3815 could be split up into a number of smaller magnetic structures. As yet another example, the number of windings 3810 may be varied, as long as coupled inductor array 3800 includes at least two windings 3810. Additionally, the number of conductor layers 3814 in each winding loop 3812 may be varied, as long as each winding loop 3812 includes at least one conductor layer 3814. Furthermore, while it is anticipated that coupled inductor array 3800 will typically be symmetrical, in some alternate embodiments, coupled inductor array 3800 has an asymmetrical construction, such as to realize an asymmetrical coupled inductor array.

Non-magnetic structures 3815 are formed of a material having a lower magnetic permeability than the material forming magnetic film layers 3809. In some embodiments, non-magnetic structures 3815 are formed of a material having a relative magnetic permeability of around one, to maximize flow of magnetic flux through winding loops 3812. Ideally, non-magnetic structures 3815 are formed of material that is electrically insulating, to prevent flow of eddy currents within non-magnetic structures 3815. However, use of different material for non-magnetic structures 3815 than for conductor layers 3814 may complicate manufacturing. For example, two different printing steps and associated masks are required to form conductor layers 3814 and non-magnetic structures 3815 of different respective materials, in some embodiments. Accordingly, in some alternate embodiments, both non-magnetic structures 3815 and conductor layers 3814 are formed of a common conductive material, with non-magnetic structures 3815 electrically isolated from windings 3810 and therefore also electrically isolated from winding loops 3812 and their constituent conductor layers 3814.

Figure 42:
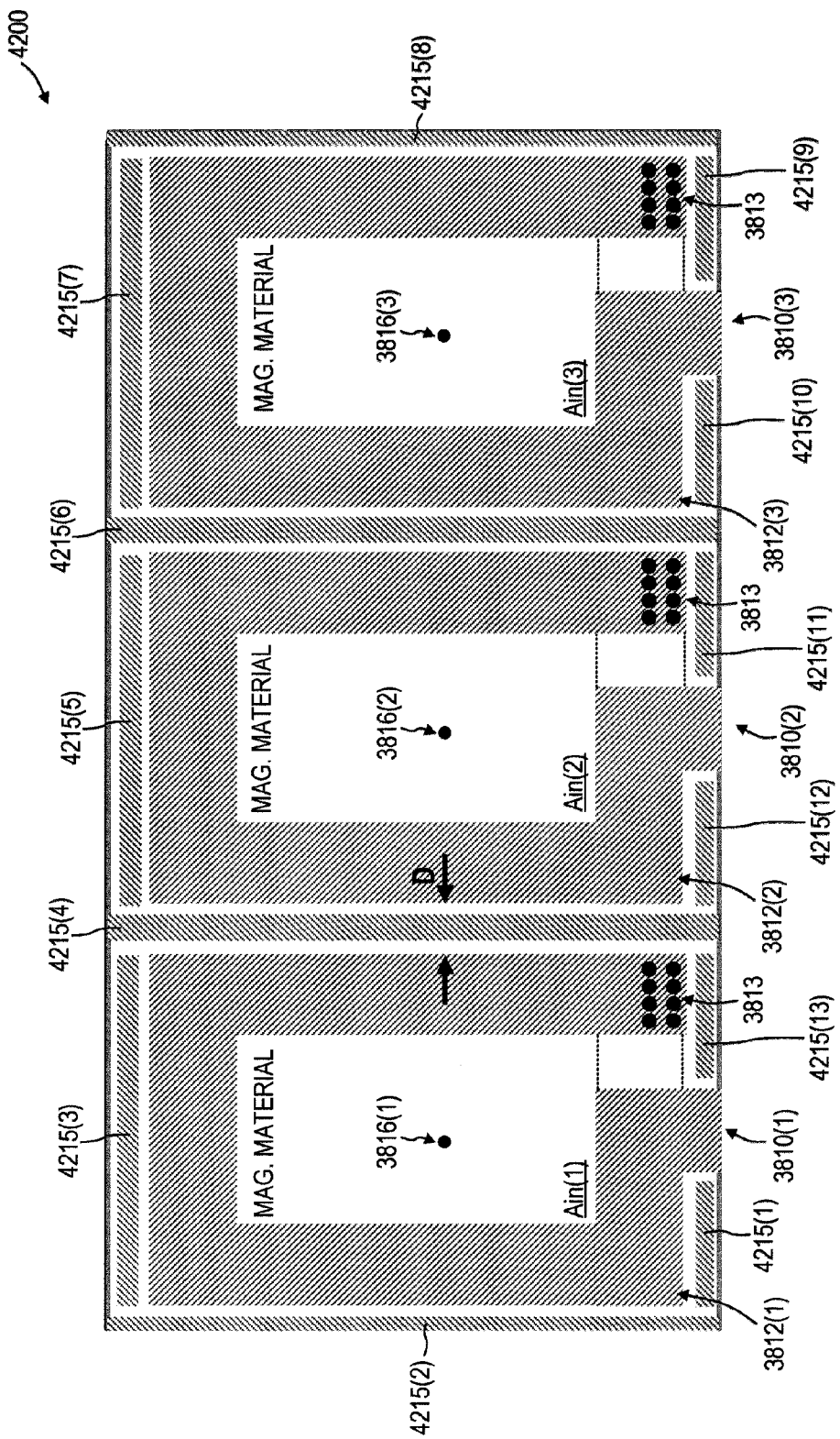
FIG. 42 is a cross-sectional view of a coupled inductor array including non-magnetic structures formed of a conductive material, according to an embodiment.

For example, FIG. 42 is a cross-sectional view, analogous to the cross-sectional view of FIG. 41, of a coupled inductor array 4200. Coupled inductor array 4200 is an alternate embodiment of coupled inductor array 3800 where non-magnetic structures 3815 are replaced with non-magnetic structures 4215 formed of a conductive material, such as the same type of conductive material forming conductor layers 3814. One or more non-magnetic structures 4215 are disposed adjacent to each winding loop 3812 in a common lengthwise by widthwise plane as the winding loop, such that lengthwise by widthwise areas of magnetic core 3808 outside of winding loops 3812 are at least substantially covered by non-magnetic structures 4215. Non-magnetic structures 4215 are electrically isolated from windings 3810 and associated winding loops 3812. It is anticipated that a plurality of separate non-magnetic structures 4215, instead of a single non-magnetic structure 4215, will be disposed in a given widthwise by lengthwise plane, to decrease flow of eddy currents and promote manufacturability.

Figure 43:
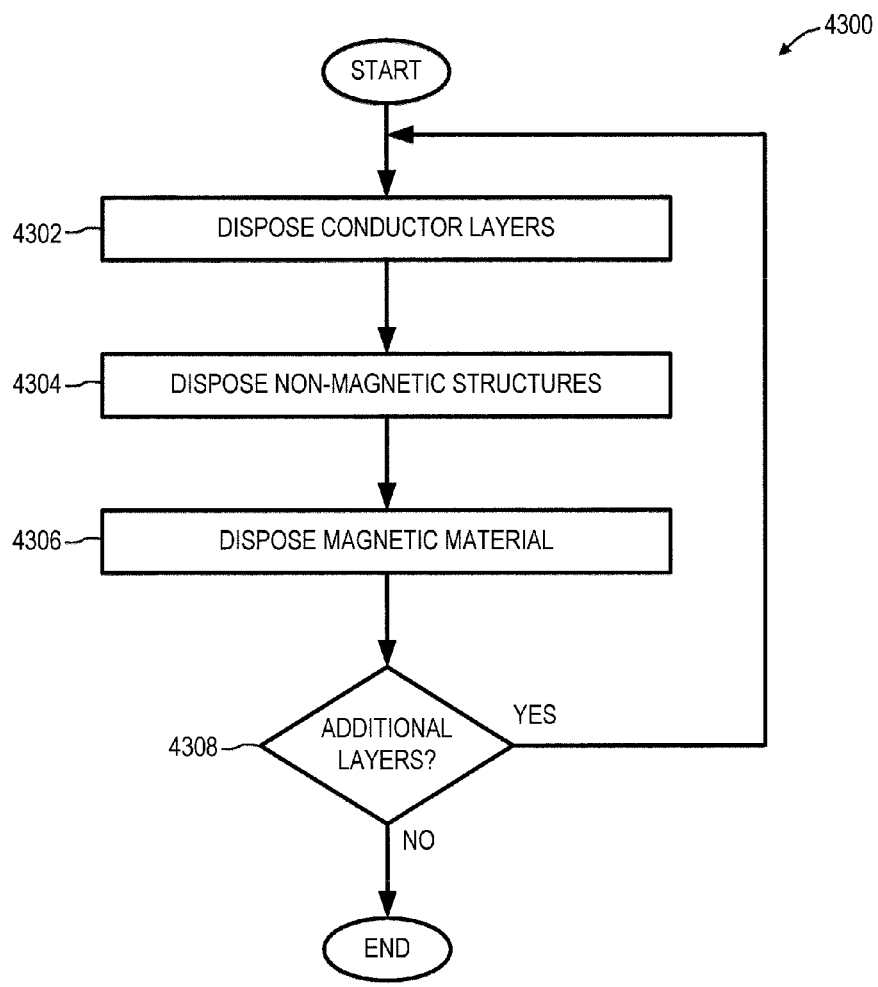
FIG. 43 illustrates a method for forming a coupled inductor array including a magnetic core with non-magnetic structures embedded therein, according to an embodiment.

FIG. 43 illustrates a method 4300 for forming a coupled inductor array including a magnetic core with non-magnetic structures embedded therein. In step 4302, at least two conductor layers are disposed in a height direction on a magnetic core portion, so that the conductor layers at least partially form at least two winding loops, as seen when viewed in the height direction. In one example of step 4302, conductor layers 3814(1), 3814(4), and 3814(7) are printed on magnetic film layer 3809(5) to partially form winding loops 3812(1), 3812(2), and 3812(3), respectively. (See FIG. 40). In step 4304, one or more non-magnetic structures are disposed on the magnetic core portion and outside of the winding loops, as seen when viewed in the height direction. In one example of step 4304, non-magnetic structure 3815(1) is printed on magnetic film layer 3809(5), outside of winding loops 3812(1), 3812(2), and 3812(3).

In step 4306, magnetic material is disposed on the magnetic core portion, the conductor layers, and the non-magnetic structures. In one example of step 4306, magnetic film layer 3809(6) is disposed on magnetic film layer 3809(5), conductor layers 3814(1), 3814(4), and 3814(7), and non-magnetic structure 3815(1). Decision step 4308 determines whether additional conductor layers are desired. If so, steps 4302 through 4306 repeat; otherwise, method 4300 ends.

Figure 44:
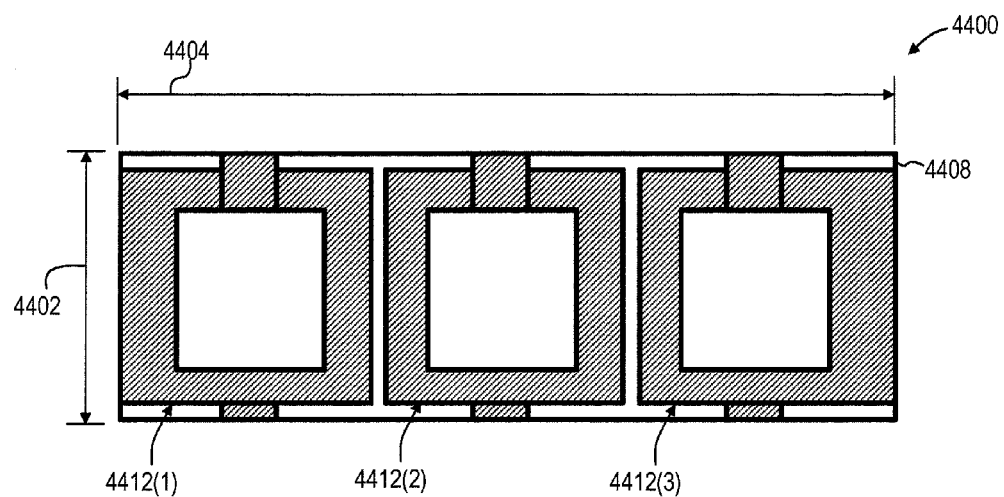
FIG. 44 is a cross-sectional view of a coupled inductor array similar to that of FIG. 33, but having larger winding loops than the FIG. 33 coupled inductor array, according to an embodiment.
Figure 45:
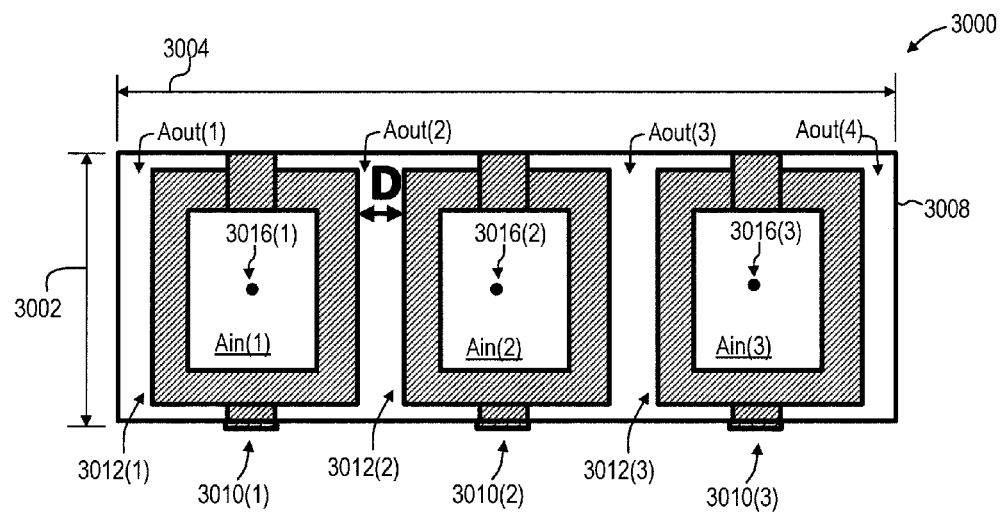
FIG. 45 is a reproduction of the FIG. 33 cross-sectional view.

Winding loop size can also be increased to impede flow of leakage magnetic flux, thereby increasing magnetic coupling of windings, with the tradeoff of increased leakage magnetic flux path reluctance. For example, FIG. 44 is a cross-sectional view of a coupled inductor array 4400 having a length 4402 and a width 4404. Winding loops 4412 are embedded in a monolithic magnetic core 4408 formed of a magnetic material having a distributed gap. Coupled inductor array 4400 is similar to coupled inductor array 3000 of FIGS. 30-33, but with larger winding loops. The cross-sectional view of coupled inductor array 3000 shown in FIG. 33 is reproduced as FIG. 45, to facilitate comparison of coupled inductor arrays 3000 and 4400. As can be observed from comparing FIGS. 44 and 45, a greater lengthwise by widthwise portion of the magnetic core is covered by winding loops in coupled inductor array 4400 than in coupled inductor array 3000. Consequentially, coupled inductor array 4400 will have stronger magnetic coupling of windings than coupled inductor array 3000, with the tradeoff of increased leakage magnetic flux reluctance, assuming all else is equal. Additionally, the increased size of winding loops in coupled inductor array 4400 relative to coupled inductor array 3000 results in windings of coupled inductor array 4400 having a lower resistance than corresponding windings of coupled inductor array 3000, assuming all else is equal.

Figure 46:
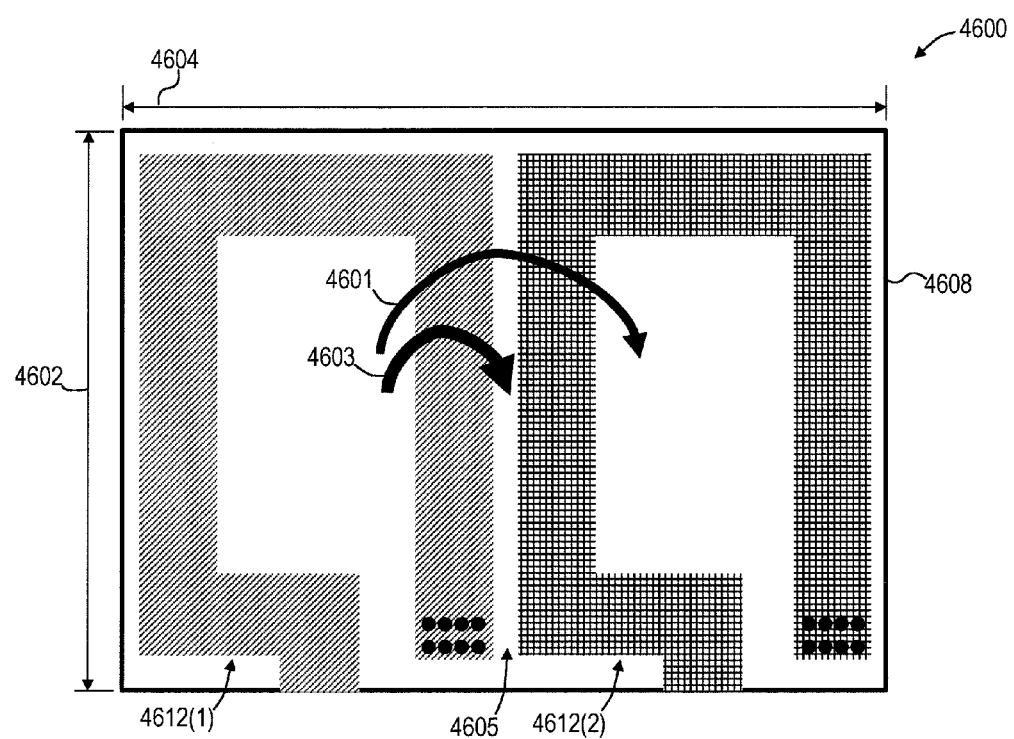
FIG. 46 shows a cross-sectional view of a coupled inductor array without inter-digitation of windings, according to an embodiment.

Applicant has further discovered that strong magnetic coupling of windings can be promoted by inter-digitation of winding loops. To help appreciate this discovery, first consider a coupled array inductor 4600 without inter-digitation of winding loops, shown in cross-sectional view in FIG. 46. Coupled inductor array 4600 has a length 4602 and a width 4604. Coupled inductor array 4600 includes two winding loops 4612 embedded in a monolithic magnetic core 4608 formed of a magnetic material having a distributed gap. Coupling magnetic flux and leakage magnetic flux are symbolically illustrated by arrows 4601 and 4603, respectively. Only leakage magnetic flux flows through area 4605 between winding loops 4612. Thus, area 4605 reduces magnetic coupling of winding loops 4612 by allowing magnetic flux to bypass winding loops 4612. It is not possible to eliminate area 4605, though, because winding loops 4612 must be separated from each other in the widthwise direction to prevent the winding loops from electrically shorting together.

Figure 47:
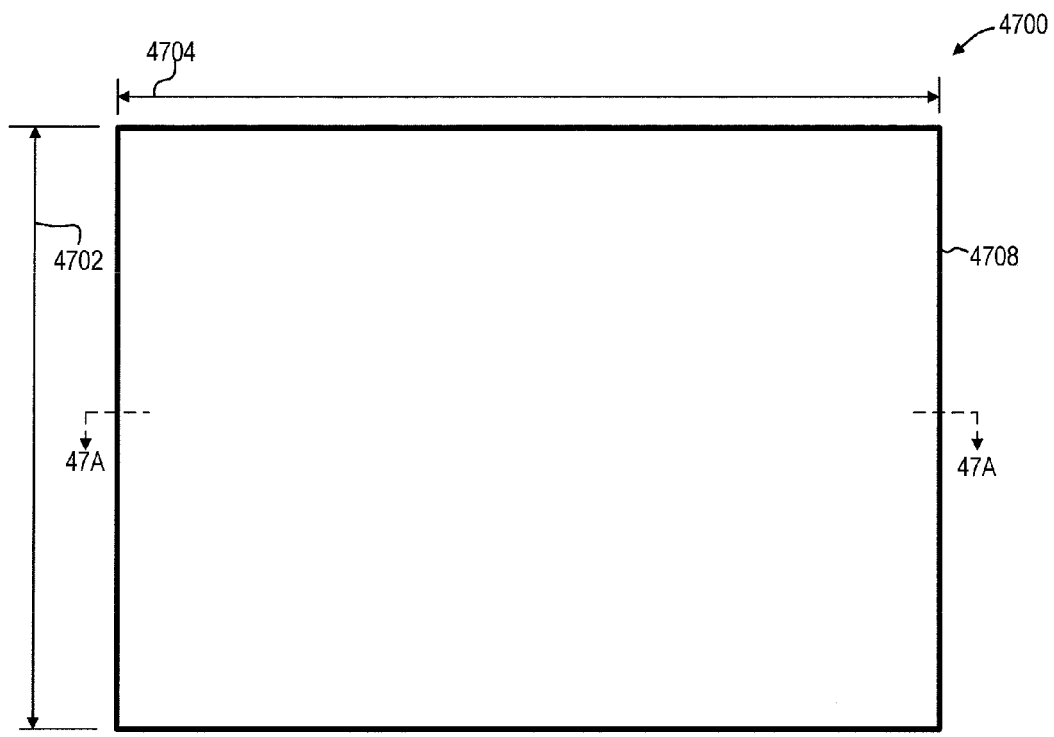
FIG. 47 shows a top plan view of a coupled inductor array including inter-digitation of windings, according to an embodiment.
Figure 48:
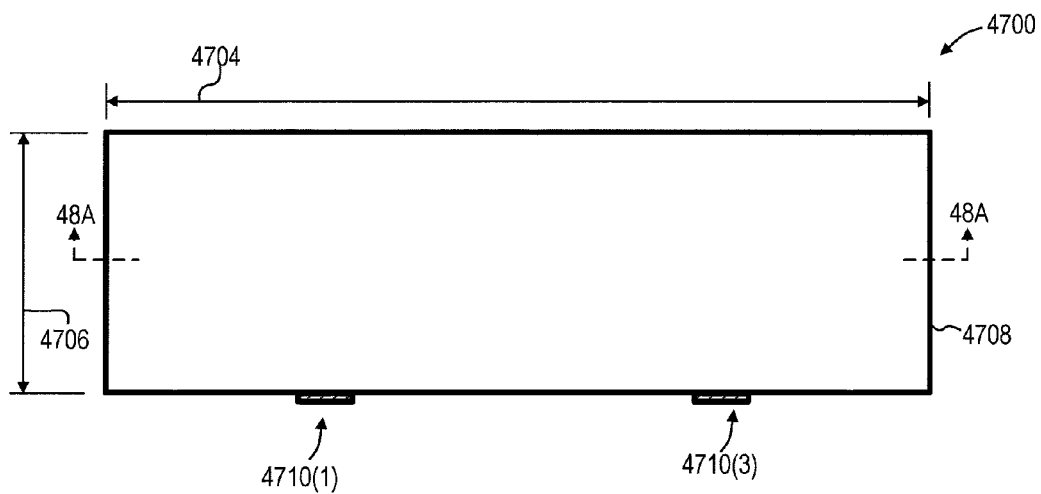
FIG. 48 shows a side elevational view of the FIG. 47 coupled inductor array.
Figure 49:
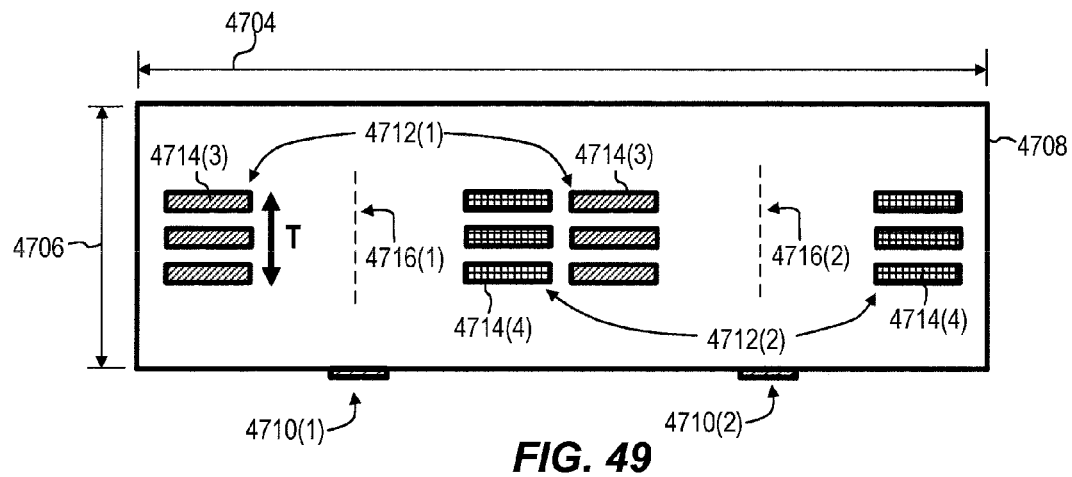
FIG. 49 shows a cross-sectional view of the FIG. 47 coupled inductor array take along line 47A-47A of FIG. 47.
Figure 50:
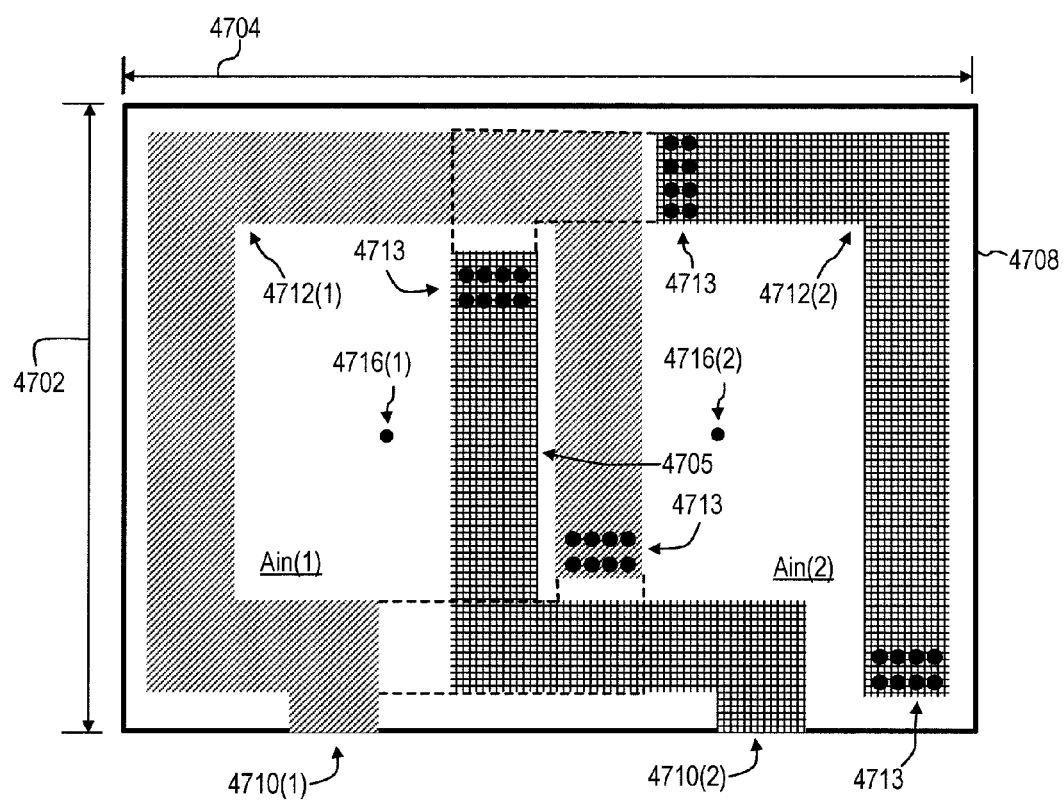
FIG. 50 shows a cross-sectional view of the FIG. 48 coupled inductor array taken along line 48A-48A of FIG. 48.

Applicant has determined that inter-digitation of winding loops can reduce or eliminate leakage magnetic flux paths attributed to winding loop separation. Consider, for example, coupled inductor array 4700, shown in top plan view in FIG. 47 and in side elevational view in FIG. 48. FIG. 49 is a cross-sectional view taken along line 47A-47A of FIG. 47, and FIG. 50 is a cross-sectional view taken along line 48A-48A of FIG. 48. Coupled inductor array 4700 has a length 4702, a width 4704, and a height 4706. One possible application of coupled inductor array 4700 is in a switching power converter application, such as in a multi-phase buck converter similar to three-phase buck converter 1200 of FIG. 12.

Coupled inductor array 4700 includes a monolithic magnetic core 4708 formed of a magnetic material having a distributed gap. For example, in some embodiments, monolithic magnetic core 4708 is formed of a single block of powdered magnetic material within a binder. As another example, in some other embodiments, monolithic magnetic core 4708 is formed from a plurality of layers of magnetic film stacked to form a monolithic magnetic core, where each magnetic film layer is formed of powder magnetic material within a binder. The distributed gap of monolithic magnetic core 4708 causes monolithic magnetic core 4708 to have a magnetic permeability that is much lower than that of typical ferrite magnetic materials.

Coupled inductor array 4700 includes windings 4710 embedded within monolithic magnetic core 4708, where each winding forms a respective winding loop 4712 of one or more turns wound around a respective winding axis 4716, where each winding axis 4716 extends in the height direction. Each winding loop 4712 includes a plurality of conductor layers 4714 separated from each other in the height direction, such that each winding loop 4712 has a thickness T in the height direction. Only some conductor layers 4714 are labeled in FIG. 49 to promote illustrative clarity. Conductor layers 4714 of each winding loop 4712 are electrically coupled in series by electrical connectors, such as conductive vias 4713 extending between adjacent conductor layers 4714 in the height direction. Outlines of winding loops 4712 are partially shown by dashed lines in FIG. 50 where conductor layers 4714 of the winding loops are not visible in the FIG. 50 cross-sectional view.

Each winding loop 4712 encloses a respective lengthwise by widthwise loop area Ain having a substantially rectangular shape that is elongated in the lengthwise direction (see FIG. 50). Areas of magnetic core 4708 enclosed by winding loops 4712 are substantially greater than areas of magnetic core 4708 outside of winding loops 4712, as seen when coupled inductor array 4700 is viewed cross-sectionally in the height direction. In other words, the collective size of magnetic core areas Ain enclosed by winding loops 4712 is significantly greater than the collective size of magnetic core areas outside of winding loops 4712, in a given length by width cross-sectional plane including winding loops 4712. This relationship between winding loop geometry, winding loop location, and magnetic core 4708 allows magnetic core 4708 to provide a low reluctance path between adjacent winding loops 4712, even though magnetic core 4708 has a relatively low magnetic permeability, similar to as discussed above with respect to coupled inductor arrays 3000 and 3800.

Furthermore, winding loops 4712 are inter-digitated in coupled inductor array 4700, or in other words, winding loops 4712 partially overlap, as seen when coupled inductor array 4700 is viewed cross-sectionally in the height direction. Such inter-digitation of winding loops 4712 results in lengthwise by widthwise area 4705 between adjacent winding loops 4712 being enclosed by both winding loops. Consequentially, area 4705 is part of the coupling magnetic flux path, instead of part of the leakage magnetic flux path. Accordingly, coupled inductor array 4700 will have stronger magnetic coupling of windings than coupled inductor array 4600, assuming all else is equal.

The fact that winding loops 4712 are inter-digitated requires that winding loops 4712 cross each other. Accordingly, a given winding turn may need to be implemented on two different layers to allow for winding loops 4712 to cross each other without electrically shorting together.

Modifications may be made to coupled inductor array 4700 without departing from the scope hereof. For example, the number of windings 4710 can be varied, as long as coupled inductor array 4700 includes at least two windings 4710. As another example, the number of conductor layers 4714 in each winding loop 4712 may be varied, as long as each winding loop 4712 includes at least one conductor layer 4714. Additionally, although magnetic core 4708 is illustrated as being homogenous, magnetic core 4708 could alternately be a composite magnetic core having two or more portions of different compositions, as long as the majority of magnetic core 4708's volume is formed of a magnetic material having a distributed gap. Furthermore, while it is anticipated that coupled inductor array 4700 will typically be symmetrical, in some alternate embodiments, coupled inductor array 4700 has an asymmetrical construction, such as to realize an asymmetrical coupled inductor array.

Combinations of Features

Features described above as well as those claimed below may be combined in various ways without departing from the scope hereof. The following examples illustrate some possible combinations:

(A1) A coupled inductor array may include a magnetic core and N windings, where N is an integer greater than one. The magnetic core may have opposing first and second sides, with a linear separation distance between the first and second sides defining a length of the magnetic core. The N windings may pass at least partially through the magnetic core in the lengthwise direction. Each of the N windings may form a loop in the magnetic core around a respective winding axis, and each winding axis may be generally perpendicular to the lengthwise direction and parallel to but offset from each other winding axis. Each winding may have opposing first and second ends extending towards at least the first and second sides of the magnetic core, respectively.

(A2) In the coupled inductor array denoted as (A1), each loop may enclose a respective first area within the magnetic core, where each first area within the magnetic core is at least partially non-overlapping with each other first area in a widthwise direction, perpendicular to the lengthwise direction.

(A3) In the coupled inductor array denoted as (A2), each first area may be completely non-overlapping with each other first area in the widthwise direction.

(A4) In either of the coupled inductor arrays denoted as (A2) or (A3), each loop may be generally planar, and each first area may be less than an area of the magnetic core between the first and second sides in the plane of the respective first area.

(A5) In any of the coupled inductor arrays denoted as (A2) through (A4), each winding axis may be offset from each other winding axis in the widthwise direction within the magnetic core.

(A6) In any of the coupled inductor arrays denoted as (A1) through (A5), the magnetic core may include top and bottom plates, and each loop may be disposed between the top and bottom plates.

(A7) In the coupled inductor array denoted as (A6), the magnetic core may further include N coupling teeth disposed between the top and bottom plates, and each of the N windings may be wound around a respective one of the N coupling teeth.

(A8) In either of the coupled inductor arrays denoted as (A6) or (A7), the magnetic core may further include at least one leakage tooth disposed between the top and bottom plates, where the at least one leakage tooth is disposed between two adjacent ones of the respective loops.

(A9) In the coupled inductor array denoted as (A8), at least one of the N coupling teeth may be formed of a different magnetic material than at least one instance of the at least one leakage tooth.

(A10) Any of the coupled inductor arrays denoted as (A7) through (A9) may further include a non-magnetic spacer disposed between at least one of the N coupling teeth and one of the top plate and the bottom plate.

(A11) In any of the coupled inductor arrays denoted as (A1) through (A5), the magnetic core may be a single-piece magnetic core, with each of the loops being embedded within the single-piece magnetic core.

(A12) In any of the coupled inductor arrays denoted as (A1) through (A11), the N windings may be arranged within the magnetic core such that a current of increasing magnitude flowing into a first of the N windings from the first side of the magnetic core is capable of inducing a current of increasing magnitude flowing into another of the N windings from the first side of the magnetic core.

(A13) In any of the coupled inductor arrays denoted as (A1) through (A12), N may be an integer greater than two.

(A14) In any of the coupled inductor arrays denoted as (A1) through (A13), each loop may be substantially disposed within a common plane in the magnetic core.

(A15) In any of the coupled inductor arrays denoted as (A1) through (A14), each of the loops may be longer in the lengthwise direction than in the widthwise direction.

(A16) In any of the coupled inductor arrays denoted as (A1) through (A15), each of the loops may have a substantially rectangular shape.

(A17) In any of the coupled inductor arrays denoted as (A1) through (A14), each loop may have a substantially circular shape.

(A18) Any of the coupled inductor arrays denoted as (A1) through (A17) may further include a common conductor electrically coupling at least two of the second ends of the N windings.

(A19) In the coupled inductor array denoted as (A18), the common conductor may form a solder tab configured for surface mount attachment to a printed circuit board.

(A20) In any of the coupled inductor arrays denoted as (A1) through (A19), at least one of the N windings may form multiple turns.

(A21) Any of the coupled inductor arrays denoted as (A1) through (A20) may be co-packaged with a semiconductor die.

(A22) Any of the coupled inductor arrays denoted as (A1) through (A20) may be disposed on a semiconductor die.

(A23) Any of the coupled inductor arrays denoted as (A1) through (A20) may be disposed on a semiconductor die and packaged in a common integrated circuit package with the semiconductor die.

(A24) Any of the coupled inductor arrays denoted as (A1) through (A20) may be co-packaged with a semiconductor die and electrically coupled to the semiconductor die.

(A25) Any of the coupled inductor arrays denoted as (A1) through (A20) may be disposed on a semiconductor die and electrically coupled to the semiconductor die.

(A26) Any of the coupled inductor arrays denoted as (A1) through (A20) may be disposed on a semiconductor die, electrically coupled to the semiconductor die, and packaged in a common integrated circuit package with the semiconductor die.

(B1) A multi-phase switching power converter may include a coupled inductor and N switching circuits, where N is an integer greater than one. The coupled may include a magnetic core and N windings. The magnetic core may have opposing first and second sides, with a linear separation distance between the first and second sides defining a length of the magnetic core. The N windings may pass at least partially through the magnetic core in the lengthwise direction, and each of the N windings may form a loop in the magnetic core around a respective winding axis. Each winding axis may be generally perpendicular to the lengthwise direction and parallel to but offset from each other winding axis. Each winding may have opposing first and second ends extending toward at least the first and second sides of the magnetic core, respectively. Each switching circuit may be adapted to be capable of repeatedly switching the first end of a respective one of the N windings between at least two different voltage levels.

(B2) The multi-phase switching power converter denoted as (B1) may further include a controller adapted to control the N switching circuits such that each of the N switching circuits is capable of switching out of phase with respect to at least one other of the N switching circuits.

(B3) In either of the multi-phase switching power converters denoted as (B1) or (B2), each loop may enclose a respective first area within the magnetic core, where each first area within the magnetic core is at least partially non-overlapping with each other first area in a widthwise direction, perpendicular to the lengthwise direction.

(B4) In the multi-phase switching power converter denoted as (B3), each first area may be completely non-overlapping with each other first area in the widthwise direction.

(B5) In either of the multi-phase switching power converters denoted as (B3) or (B4), each loop may be generally planar, and each first area may be less than an area of the magnetic core between the first and second sides in the plane of the respective first area.

(B6) In any of the multi-phase switching power converters denoted as (B1) through (B5), each winding axis may be offset from each other winding axis in the widthwise direction within the magnetic core.

(B7) In any of the multi-phase switching power converters denoted as (B1) through (B6), the magnetic core may include top and bottom plates, and each loop may be disposed between the top and bottom plates.

(B8) In the multi-phase switching power converter denoted as (B7), the magnetic core may further include N coupling teeth disposed between the top and bottom plates, and each of the N windings may be wound around a respective one of the N coupling teeth.

(B9) In either of the multi-phase switching power converters denoted as (B7) or (B8), the magnetic core may further include at least one leakage tooth disposed between the top and bottom plates, where the at least one leakage tooth is disposed between two adjacent ones of the respective loops.

(B10) In the multi-phase switching power converter denoted as (B9), at least one of the N coupling teeth may be formed of a different magnetic material than at least one instance of the at least one leakage tooth.

(B11) Any of the multi-phase switching power converters denoted as (B8) through (B10) may further include a non-magnetic spacer disposed between at least one of the N coupling teeth and one of the top plate and the bottom plate.

(B12) In any of the multi-phase switching power converters denoted as (B1) through (B6), the magnetic core may be a single-piece magnetic core, with each of the loops being embedded within the single-piece magnetic core.

(B13) In any of the multi-phase switching power converters denoted as (B1) through (B12), the multi-phase switching power converter may include at least one of a multi-phase buck converter, a multi-phase boost converter, and a multi-phase buck-boost converter.

(B14) In any of the multi-phase switching power converters denoted as (B1) through (B13), the N windings may be arranged within the magnetic core such that a current of increasing magnitude flowing into a first of the N windings from the first side of the magnetic core is capable of inducing a current of increasing magnitude flowing into another of the N windings from the first side of the magnetic core.

(B15) In any of the multi-phase switching power converters denoted as (B1) through (B14), N may be an integer greater than two.

(B16) In any of the multi-phase switching power converters denoted as (B1) through (B15), each loop may be substantially disposed within a common plane in the magnetic core.

(B17) In any of the multi-phase switching power converters denoted as (B1) through (B16), each of the loops may be longer in the lengthwise direction than in the widthwise direction.

(B18) In any of the multi-phase switching power converters denoted as (B1) through (B17), each of the loops may have a substantially rectangular shape.

(B19) In any of the multi-phase switching power converters denoted as (B1) through (B16), each loop may have a substantially circular shape.

(B20) Any of the multi-phase switching power converters denoted as (B1) through (B19) may further include a common conductor electrically coupling at least two of the second ends of the N windings.

(B21) In the multi-phase switching power converter denoted as (B20), the common conductor may form a solder tab configured for surface mount attachment to a printed circuit board.

(B22) In any of the multi-phase switching power converters denoted as (B1) through (B21), at least one of the N windings may form multiple turns.

(C1) A coupled inductor array having length, width, and height may include a monolithic magnetic core formed of a magnetic material having a distributed gap and a plurality of windings embedded in the monolithic magnetic core. Each winding may form a respective winding loop of one or more turns around a respective winding axis, where each winding axis extends in the height direction. Areas of the monolithic magnetic core enclosed by the winding loops may be greater than areas of the monolithic magnetic core outside of the winding loops, as seen when the coupled inductor array is viewed cross-sectionally in the height direction.

(C2) In the coupled inductor array denoted as (C1): the winding loops may be separated from each other in the widthwise direction, and each winding loop may enclose a respective loop area that is elongated in the lengthwise direction.

(C3) In the coupled inductor array denoted as (C2), each loop area may have a substantially rectangular shape.

(C4) In any of the coupled inductor arrays denoted as (C1) through (C3): (1) each winding loop may have a thickness T in the height direction, (2) adjacent winding loops may be separated from each other by a widthwise separation distance D, and (3) D may be less than T.

(C5) In the coupled inductor array denoted as (C4), D may be greater than 0.1*T.

(C6) Any of the coupled inductor arrays denoted as (C1) through (C5) may further include one or more non-magnetic structures embedded in the monolithic magnetic core, where the one or more non-magnetic structures are disposed outside of the winding loops, as seen when the coupled inductor array is viewed cross-sectionally in the height direction.

(C7) In the coupled inductor array denoted as (C6), the one or more non-magnetic structures may include at least one non-magnetic structure disposed adjacent to each winding loop, in a common lengthwise by widthwise plane with the winding loop.

(C8) In either of the coupled inductor arrays denoted as (C6) or (C7), the one or more non-magnetic structures may have a magnetic permeability that is lower than a magnetic permeability of the magnetic material having the distributed gap.

(C9) In any of the coupled inductor arrays denoted as (C6) through (C8), the one or more non-magnetic structures may be formed of an electrically conductive material, and the one or more non-magnetic structures may be electrically isolated from the plurality of windings.

(C10) In the coupled inductor array denoted as (C9), the one or more non-magnetic structures and the plurality of windings may be formed of a common material.

(C11) In the coupled inductor array denoted as (C1), at least two of the winding loops may partially overlapping with each other, as seen when the coupled inductor array is viewed cross-sectionally in the height direction.

(C12) In the coupled inductor array of denoted as (C11), two of the winding loops may enclose a common lengthwise by widthwise area within the monolithic magnetic core.

(C13) In either of the coupled inductor arrays denoted as (C11) or (C12), each winding loop may enclose a respective loop area that is elongated in the lengthwise direction.

(C14) In the coupled inductor array denoted as (C13), each loop area may have a substantially rectangular shape.

(C15) In any of the coupled inductor arrays denoted as (C1) through (C14), the magnetic material having a distributed gap may include powdered magnetic material within a binder.

(C16) In the coupled inductor array denoted as (C15), the monolithic magnetic core may be a block magnetic core.

(C17) In the coupled inductor array denoted as (C15), the monolithic magnetic core may include a plurality of layers of magnetic film stacked in the height direction.

(D1) A method for forming a coupled inductor array including a magnetic core with at least one non-magnetic structure embedded therein may include the following steps: (1) disposing, in a height direction, at least two conductor layers on a magnetic core portion, such that the at least two conductor layers at least partially form at least two winding loops, as seen when viewed in the height direction, (2) disposing one or more non-magnetic structures on the magnetic core portion and outside of the at least two winding loops, as seen when viewed in the height direction, and (3) disposing magnetic material on the magnetic core portion, the at least two conductor layers, and the one or more non-magnetic structures.

(D2) In the method denoted as (D1), the non-magnetic structures may have a magnetic permeability that is lower than a magnetic permeability of the magnetic material disposed on the magnetic core portion.

(D3) In either of methods denoted as (D1) or (D2), the one or more non-magnetic structures may be formed of an electrically conductive material, and the one or more non-magnetic structures may be electrically isolated from the at least two winding loops.

(D4) In the method denoted as (D3), the one or more non-magnetic structures and the at least two conductor layers may be formed of a common material.

Changes may be made in the above methods and systems without departing from the scope hereof. For example, the number of windings in each array may be varied. Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A coupled inductor array having length, width, and height, the coupled inductor array comprising:
a monolithic magnetic core formed of a magnetic material having a distributed gap;
a plurality of windings embedded in the monolithic magnetic core, each winding forming a respective winding loop of one or more turns around a respective winding axis, each winding axis extending in the height direction, each winding axis offset from each other winding axis in the widthwise direction; and one or more magnetic flux impeding structures embedded in the monolithic magnetic core, the one or more magnetic flux impeding structures having a magnetic permeability that is lower than a magnetic permeability of the magnetic material having the distributed gap, the one or more magnetic flux impeding structures being disposed outside of the winding loops, as seen when the coupled inductor array is viewed cross-sectionally in the height direction, the one or more magnetic flux impeding structures comprising at least one magnetic flux impeding structure disposed outside of each winding loop, in a common lengthwise by widthwise plane with the winding loop, the monolithic magnetic core overlapping with each of the one or more magnetic flux impeding structures, as seen when the coupled inductor array is viewed cross-sectionally in the height direction, areas of the monolithic magnetic core enclosed by the winding loops and non-overlapping with the winding loops being greater than areas of the monolithic magnetic core outside of the winding loops, as seen when the coupled inductor array is viewed cross-sectionally in the height direction.

2. The coupled inductor array of claim 1, wherein:
the winding loops are separated from each other in the widthwise direction;
each winding loop encloses a respective loop area that is elongated in the lengthwise direction.

3. The coupled inductor array of claim 2, each loop area having a substantially rectangular shape.

4. The coupled inductor array of claim 3, wherein:
each winding loop has a thickness T in the height direction;
adjacent winding loops are separated from each other by a widthwise separation distance D; and
D is less than T.

5. The coupled inductor array of claim 4, D being greater than 0.1*T.

6. The coupled inductor array of claim 1, at least two of the winding loops partially overlapping with each other, as seen when the coupled inductor array is viewed cross-sectionally in the height direction.

7. The coupled inductor array of claim 6, two of the winding loops enclosing a common lengthwise by widthwise area within the monolithic magnetic core.

8. The coupled inductor array of claim 1, the magnetic material having a distributed gap comprising powdered magnetic material within a binder.

9. The coupled inductor array of claim 8, the monolithic magnetic core being a block magnetic core.

10. The coupled inductor array of claim 8, the monolithic magnetic core comprising a plurality of layers of magnetic film stacked in the height direction.

11. The coupled inductor array of claim 1, the one or more magnetic flux impeding structures non-overlapping with the winding loops, as seen when the coupled inductor array is viewed cross-sectionally in the height direction.

12. The coupled inductor array of claim 1, the one or more magnetic flux impeding structures impeding flow of magnetic flux within the monolithic magnetic core in the height direction.

13. A coupled inductor array having length, width, and height, the coupled inductor array comprising:

a monolithic magnetic core formed of a magnetic material having a distributed gap;

a plurality of windings embedded in the monolithic magnetic core, each winding forming a respective winding loop of one or more turns around a respective winding axis, each winding axis extending in the height direction, each winding axis offset from each other winding axis in the widthwise direction; and one or more magnetic flux impeding structures embedded in the monolithic magnetic core, the one or more magnetic flux impeding structures having a magnetic permeability that is lower than a magnetic permeability of the magnetic material having the distributed gap, the one or more magnetic flux impeding structures being disposed only outside of the winding loops, as seen when the coupled inductor array is viewed cross-sectionally in the height direction, the one or more magnetic flux impeding structures being formed of an electrically conductive material, the one or more magnetic flux impeding structures being electrically isolated from the plurality of windings, the one or more magnetic flux impeding structures non-overlapping with the winding loops, as seen when the coupled inductor array is viewed cross-sectionally in the height direction, and the monolithic magnetic core overlapping with each of the one or more magnetic flux impeding structures, as seen when the coupled inductor array is viewed cross-sectionally in the height direction.

14. The coupled inductor array of claim 13, the one or more magnetic flux impeding structures and the plurality of windings being formed of a common material.

* * * * *